US012608610B1

(12) United States Patent
Pareek et al.

(10) Patent No.: US 12,608,610 B1
(45) Date of Patent: Apr. 21, 2026

(54) SYNTHETIC DATA GENERATION SYSTEM AND METHOD

(71) Applicant: Future AGI Inc., Lewes, DE (US)

(72) Inventors: Nikhil Pareek, Lewes, DE (US);
Rishav Hada, Lewes, DE (US);
Srikanth Malyala, Lewes, DE (US);
N.V.J.K Kartik, Lewes, DE (US)

(73) Assignee: FUTURE AGI INC., Lewes, DE (US)

( * ) Notice: Subject to any disclaimer, the term of this patent is extended or adjusted under 35 U.S.C. 154(b) by 0 days.

(21) Appl. No.: 19/219,261

(22) Filed: May 27, 2025

(51) Int. Cl.
*G06N 3/08* (2023.01)
(52) U.S. Cl.
CPC ...................................... *G06N 3/08* (2013.01)
(58) Field of Classification Search
CPC ....................................................... G06N 3/08
See application file for complete search history.

(56) References Cited

U.S. PATENT DOCUMENTS

| | | | | |
|---|---|---|---|---|
| 2022/0058437 A1* | 2/2022 | Soni | .......................... | G06N 3/08 |
| 2023/0073695 A1* | 3/2023 | Goodsitt | ................. | H04L 67/34 |
| 2023/0082365 A1* | 3/2023 | Shiarlis | ................ | G05B 13/027 |
| | | | | 701/27 |
| 2023/0140834 A9* | 5/2023 | Hazard | .................... | G06N 7/01 |
| | | | | 382/159 |
| 2023/0186026 A1* | 6/2023 | Arthur | .................. | G06F 40/237 |
| | | | | 704/9 |
| 2023/0409607 A1* | 12/2023 | Pratik | .................... | G06N 3/094 |
| 2024/0371015 A1* | 11/2024 | Ansari | ................. | G06N 3/0895 |
| 2025/0124332 A1* | 4/2025 | Nakamura Sakai | ..... | G06N 5/01 |
| 2025/0139418 A1* | 5/2025 | Saplicki | ................. | G06N 3/047 |

FOREIGN PATENT DOCUMENTS

WO        2024164723  A1      8/2024

OTHER PUBLICATIONS

Of Song et al. ("Discriminator Contrastive Divergence: Semi-Amortized Generative Modeling by Exploring Energy of the Discriminator", arXiv, Apr. 5, 2020) (Year: 2020).*

* cited by examiner

*Primary Examiner* — Imad Kassim
(74) *Attorney, Agent, or Firm* — Jason A. Smith; Shumaker, Loop & Kendrick, LLP

(57) ABSTRACT

A computer-implemented method for generating synthetic data is provided. The method includes receiving user input specifying domain-specific requirements for synthetic data generation and selecting a scenario type. The scenario type is one of Seedless, Seeded, or combination of Seeded and Knowledge Base (KB). The method defines a structured schema based on the user input. The structured schema includes data fields, relationships between data fields, and distributional targets. Based on the structured schema, the method generates an initial set of synthetic data samples using a neural template-driven generation model trained on domain-specific data. The method applies adversarial contrastive sampling. This involves training a discriminator neural network to distinguish between the initial set of synthetic samples and real data samples. The discriminator neural network is used to identify generated samples similar to real data. A contrastive set of samples dissimilar to those identified as similar by the discriminator is generated. The method integrates the initial set of synthetic data samples with the contrastive set to create the synthetic data.

18 Claims, 6 Drawing Sheets

100

PROCESSOR(S) (108)

I/O INTERFACE (S)

MEMORY (112)

102

Network

106

104-1

104-2

104-N

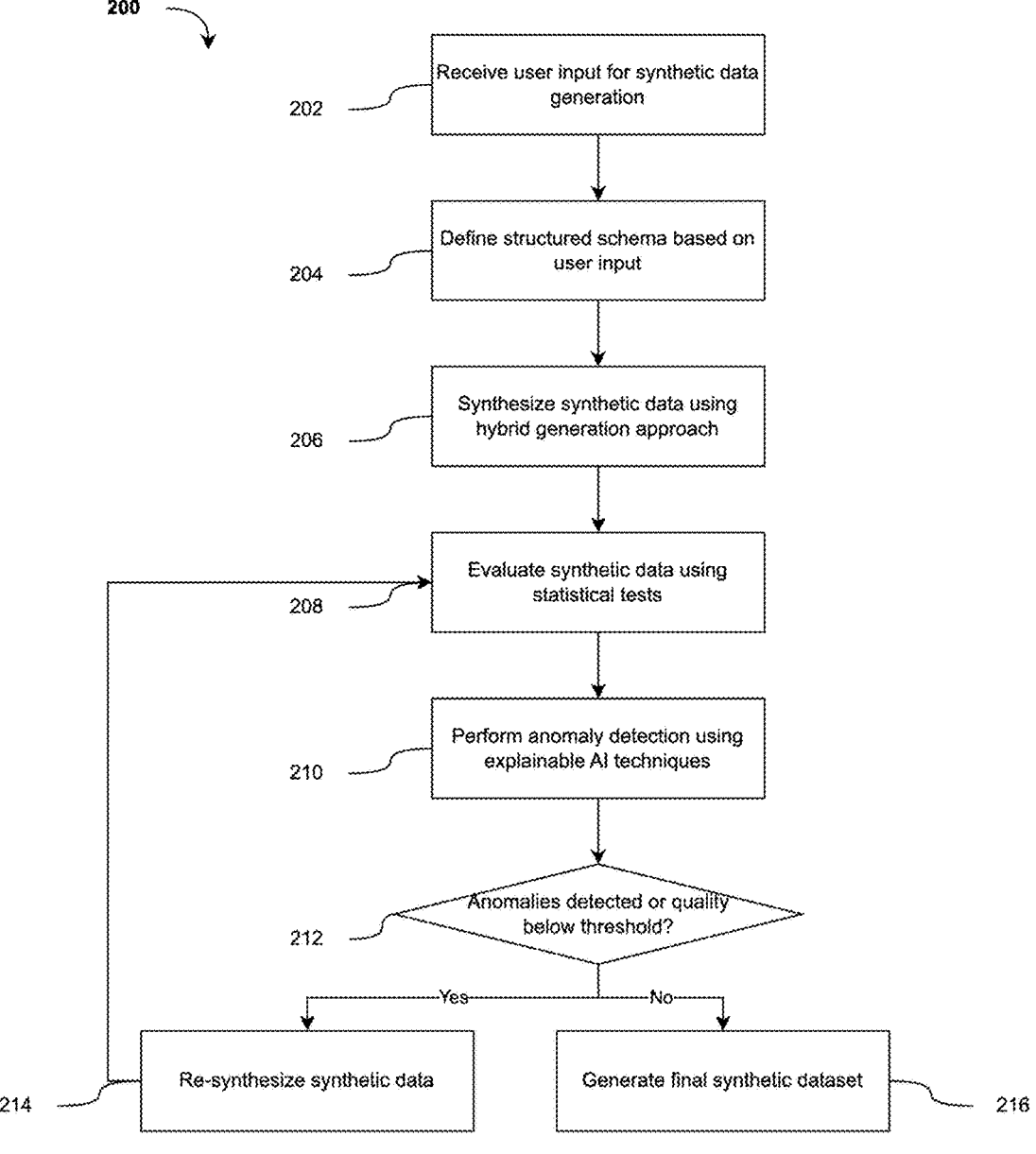

200

202 — Receive user input for synthetic data generation

204 — Define structured schema based on user input

206 — Synthesize synthetic data using hybrid generation approach

208 — Evaluate synthetic data using statistical tests

210 — Perform anomaly detection using explainable AI techniques

212 — Anomalies detected or quality below threshold?

Yes / No

214 — Re-synthesize synthetic data

216 — Generate final synthetic dataset

FIG. 2

SYNTHETIC DATA GENERATION SYSTEM AND METHOD

FIELD OF INVENTION

The present disclosure relates to synthetic data generation systems, and more particularly to a multi-agent, retrieval-augmented framework for generating high-fidelity synthetic data that mirrors real-world datasets while preserving privacy.

BACKGROUND

Synthetic data generation has become increasingly important in various fields, including artificial intelligence, machine learning, and data analytics. As organizations strive to develop and train advanced models, they often face challenges related to data scarcity, privacy concerns, and regulatory constraints. These issues can hinder the development of robust and effective AI systems, particularly in sensitive domains such as healthcare, finance, and law enforcement.

Traditional approaches to data collection and utilization often struggle to provide sufficient quantities of high-quality, diverse data while maintaining compliance with privacy regulations. Real-world datasets may be limited in size, contain biases, or be restricted due to confidentiality requirements. These limitations can lead to suboptimal model performance, reduced generalization capabilities, and potential ethical concerns.

Synthetic data generation techniques have emerged as a potential solution to address these challenges. By creating artificial datasets that mimic the statistical properties and patterns of real-world data, organizations can augment their training processes and overcome some of the limitations associated with using solely real data. However, existing synthetic data generation methods often face difficulties in simultaneously maintaining statistical fidelity, diversity, and real-world grounding.

Many current approaches to synthetic data generation rely on single-pass generative models or simplified statistical techniques. These methods may struggle to capture complex relationships present in real-world data, leading to synthetic datasets that lack the depth and variability required for training sophisticated AI models. Additionally, ensuring that synthetic data remains grounded in realistic scenarios and does not introduce unintended artifacts or biases remains an ongoing challenge.

Furthermore, the process of generating synthetic data often requires domain expertise and manual intervention to define appropriate parameters and constraints. This can be time-consuming and may limit the scalability and adaptability of synthetic data generation across different domains and use cases.

As the demand for high-quality training data continues to grow, there is a need for advanced synthetic data generation techniques that can address these limitations. Improved methods for creating diverse, realistic, and privacy-preserving synthetic datasets could enable organizations to develop more robust AI models, accelerate innovation, and unlock new possibilities in data-driven decision-making across various industries.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for generating synthetic data is provided. The method includes receiving user input specifying domain-specific requirements for synthetic data generation and selecting a scenario type, wherein the scenario type is one of Seedless, Seeded, or combination of Seeded and Knowledge Base (KB). The method further includes defining a structured schema based on the user input, wherein the structured schema includes data fields, relationships between data fields, and distributional targets. Based on the structured schema, the method generates an initial set of synthetic data samples using a neural template-driven generation model trained on domain-specific data. The method applies adversarial contrastive sampling by training a discriminator neural network to distinguish between the initial set of synthetic samples and real data samples, using the discriminator neural network to identify generated samples similar to real data, and generating a contrastive set of samples dissimilar to those identified as similar by the discriminator. The method then integrates the initial set of synthetic data samples with the contrastive set to create the synthetic data.

According to other aspects of the present disclosure, the method may include one or more of the following features. The hybrid generation approach may iteratively refine the synthetic data by repeating the generation and adversarial contrastive sampling steps until a predetermined diversity threshold is met, the diversity being measured using embedding space distance metrics between samples. The neural template-driven generation model may be a Large Language Model, wherein the Large Language Model is trained on a domain-specific corpus annotated with examples of valid synthetic data corresponding to the structured schema. The method may further comprise segmenting and indexing large documents into smaller chunks, and storing the chunks in a vector database and/or knowledge graph if the selected scenario involves the use of the knowledge base. The method may further comprise performing partial classification on a subset of the chunks, allowing for updates to a taxonomy based on the domain-specific data. The method may further comprise validating the structured schema to ensure compliance with domain constraints and resolving any conflicts. The method may further comprise classifying input data into entities, relationships, and categories based on the defined schema using a multi-layered classification system when the selected scenario is one of Seeded or combination. The method may further comprise performing a retrieval-augmented generation process by conducting a semantic similarity search within the knowledge base using a vector database, and extracting contextual information through knowledge graph traversal to ground the generated synthetic data in relevant domain context. The method may further comprise generating counterfactual data points using causal inference techniques to model complex causal relationships and explore "what-if" scenarios. The method may further comprise validating the generated synthetic data through local consistency checks, ensuring attribute coherence and adherence to specified constraints, including date and format consistency. The statistical tests may include distributional tests such as Wasserstein distance and Maximum Mean Discrepancy. The re-synthesizing process may involve adjusting retrieval queries, constraints, and re-running relevant steps in the synthetic data generation process for iterative refinement of the data. The final synthetic dataset may be domain-grounded, privacy-compliant, and ready for machine learning training, testing, and analysis. The method may further comprise performing adversarial validation and robustness testing to assess the synthetic data against edge cases, ensuring its readiness for deployment in real-world machine learning applications. The method may further comprise evaluating the synthetic data by applying statistical tests and performing embedding space analysis to assess semantic quality. The method may further comprise performing anomaly detection on the synthetic data using explainable AI techniques, comprising one or more of SHAP (SHapley Additive explanations), Chain-of-Thought prompting, and, LIME (Local Interpretable Model-agnostic Explanations), to identify gaps or inconsistencies in the synthetic data and provide insights for targeted refinement. The method may further comprise re-synthesizing the synthetic data upon detection of the anomaly or when the quality of the synthetic data falls below a defined threshold to generate a final synthetic dataset. When the scenario type is Seeded or Knowledge Base (KB) is integrated, the method may further comprise performing statistical tests, including Chi-Square or Kolmogorov-Smirnov (KS) tests, to detect significant divergences between the synthetic data and reference data, and, upon detection of such divergences, adjusting one or more parameters of the synthetic data generation process, wherein the adjustments include modifying a sampling temperature, increasing template variety, or refining the specificity of retrieval process to enhance statistical alignment between the synthetic data and the reference data.

According to another aspect of the present disclosure, a computer-implemented method for generating synthetic data is provided. The method includes receiving user input specifying domain-specific requirements for synthetic data generation and a knowledge base comprising one or more documents. The method further includes segmenting the documents into chunks and indexing the chunks in at least one of a vector database and a knowledge graph. The method performs partial classification on a subset of the chunks to update a domain taxonomy. The method defines and validates a structured schema that includes data fields, relationships between data fields, and distributional targets, the structured schema being based on the user input and the updated taxonomy. The method classifies input data into entities, relationships, and categories according to the structured schema by using a multi-layered classification system. The method synthesizes synthetic data in accordance with the structured schema, the synthesizing comprising performing retrieval-augmented generation by executing a semantic similarity search in the vector database and extracting contextual information via knowledge-graph traversal, applying a hybrid generation approach that combines neural template-driven generation with adversarial contrastive sampling, generating counterfactual data points using causal inference techniques, and executing local consistency checks to ensure attribute coherence and adherence to constraints. The method evaluates the synthetic data by applying statistical tests and performing embedding-space analysis to assess semantic quality. The method detects anomalies in the synthetic data with explainable-AI techniques comprising one or more of SHAP (SHapley Additive explanations), Chain-of-Thought prompting, and, LIME (Local Interpretable Model-agnostic Explanations) to identify gaps or inconsistencies and provide insights for targeted refinement. The method re-synthesizes the synthetic data when an anomaly is detected or when a quality measure of the synthetic data is below a defined threshold, the re-synthesizing including adjusting retrieval queries, constraints, and generation parameters and re-running of the synthetic-data generation process. The method outputs a final synthetic dataset that is domain-grounded, privacy-compliant, and ready for machine-learning training, testing, or analysis.

According to another aspect of the present disclosure, a system for generating synthetic data is provided. The system includes a processor and a memory storing instructions that, when executed by the processor, cause the processor to receive user input specifying domain-specific requirements for synthetic data generation and selecting a scenario type, wherein the scenario type is one of Seedless, Seeded, or combination of Seeded and Knowledge Base (KB). The processor is further caused to define a structured schema based on the user input, wherein the structured schema includes data fields, relationships between data fields, and distributional targets. Based on the structured schema, the processor generates an initial set of synthetic data samples using a neural template-driven generation model trained on domain-specific data. The processor applies adversarial contrastive sampling by training a discriminator neural network to distinguish between the initial set of synthetic samples and real data samples, using the discriminator neural network to identify generated samples similar to real data, and generating a contrastive set of samples dissimilar to those identified as similar by the discriminator. The processor then integrates the initial set of synthetic data samples with the contrastive set to create the synthetic data.

The foregoing general description of the illustrative embodiments and the following detailed description thereof are merely exemplary aspects of the teachings of this disclosure and are not restrictive.

BRIEF DESCRIPTION OF THE DRAWINGS

The foregoing detailed description of embodiments is better understood when read in conjunction with the appended drawings. For the purpose of illustrating the present subject matter, examples of constructions of the present subject matter are provided in the figures. However, the invention is not limited to the specific methods and systems for synthetic data generation disclosed in this document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

FIG. 2 illustrates a method for generating synthetic data, in accordance with an embodiment of the present subject matter.

Figure 1:
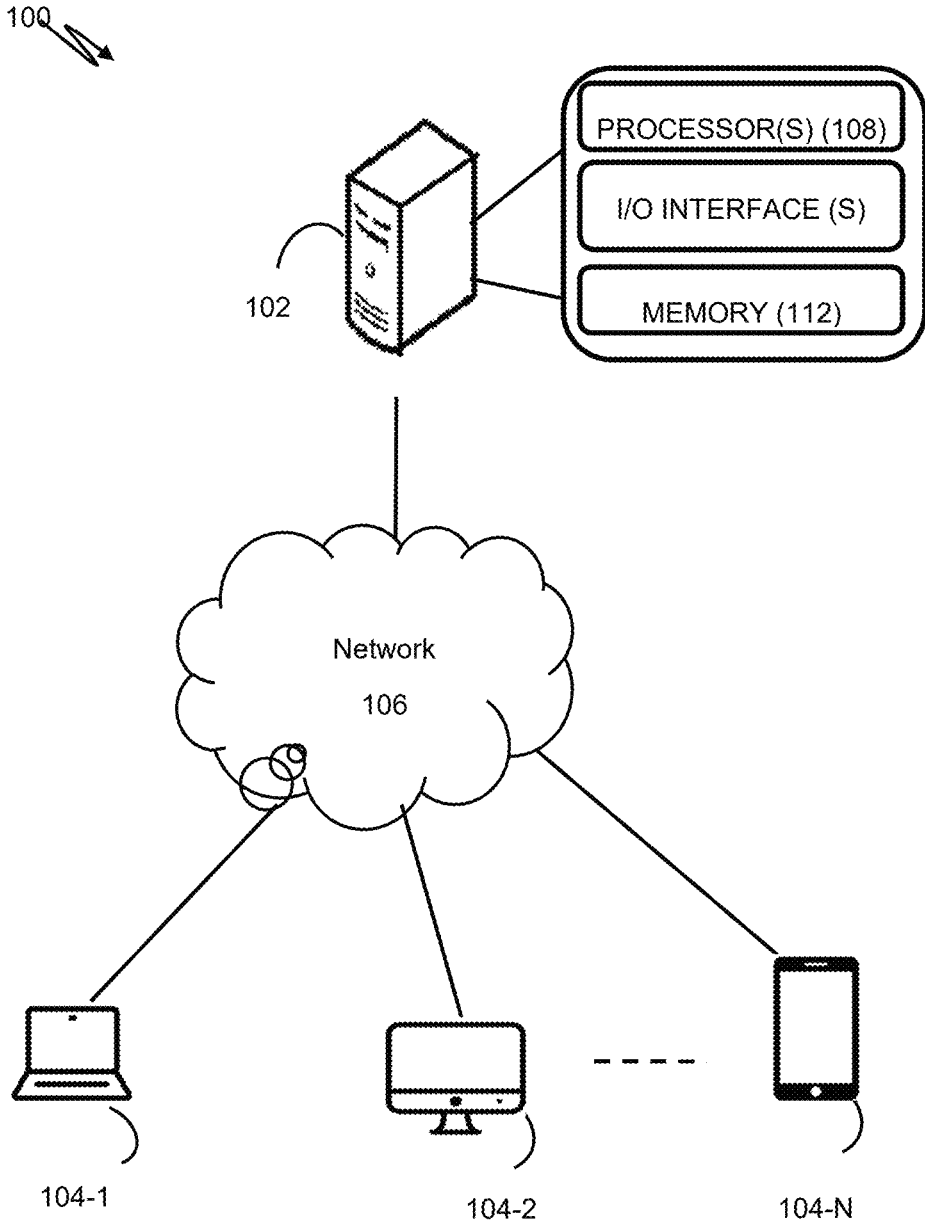
FIG. 1 illustrates a network implementation of a synthetic data generation system, in accordance with an embodiment of the present subject matter.

The figures depict embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "defining," "synthesizing," "evaluating," "performing," "re-synthesizing," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system synthetic data generation. The system and the method address the growing demand for high-quality, diverse, and privacy-compliant datasets in various fields such as healthcare, finance, and artificial intelligence research.

At its core, the system and the method employs a chain of specialized agents working in concert to generate synthetic data that closely mimics real-world distributions while preserving privacy and maintaining contextual relevance. The system supports three operational modes that can be selected at runtime to suit the availability of reference information-ranging from situations with no prior data to scenarios that leverage one or more knowledge bases.

Seedless Mode-Synthetic data is generated without ingesting or referencing any seed dataset or external knowledge base; generation relies solely on pre-defined domain rules, probabilistic models, and retrieval-free templates.

Seeded Mode-A user-supplied seed dataset is ingested, segmented, and indexed to serve as an internal knowledge base that guides distribution targets and contextual constraints during synthetic-data generation; no additional external documents are incorporated.

Seeded+Knowledge-Base (Seeded+KB) Mode—The Seeded Mode is extended by ingesting one or more external documents or corpora that are segmented, embedded, and stored in a vector database and/or knowledge graph, enabling retrieval-augmented generation grounded in both the seed dataset and the supplemental knowledge base.

Further, it may be noted that the system is able to dynamically adapt to user requirements and domain-specific constraints. The system interprets user inputs to create a structured schema, which then guides the data generation process. This flexibility allows the system to be applied across a wide range of industries and use cases.

The system incorporates advanced machine learning techniques, including neural template-driven generation and adversarial sampling, to produce diverse and realistic synthetic data. It also leverages domain knowledge through a sophisticated retrieval and integration process, ensuring that the generated data is grounded in relevant context.

A significant aspect of the system is its iterative refinement capability. The system continuously evaluates the quality of the synthetic data, detecting anomalies and inconsistencies. When issues are identified, it can automatically adjust its parameters and regenerate data, ensuring the final output meets specified quality thresholds.

The system addresses several technical challenges in the field of synthetic data generation:

1. Balancing data fidelity with privacy preservation
2. Ensuring diversity and representativeness in synthetic datasets
3. Maintaining contextual relevance and logical consistency in generated data
4. Adapting to various domain-specific requirements and constraints
5. Automating the process of data quality assessment and improvement By solving these challenges, the system and the method enables organizations to overcome data scarcity issues, enhance privacy compliance, and improve the robustness of their machine learning models. It provides a powerful tool for generating large-scale, high-quality synthetic datasets that can accelerate innovation in data-driven fields while mitigating risks associated with using sensitive real-world data.

Referring now to FIG. 1, a network implementation 100 of a multi-agent synthetic data generation system 102 is disclosed. Initially, the system 102 receives user input specifying domain-specific requirements and a scenario type for synthetic data generation. In an example, the software may be installed on a user device 104-1. It may be noted that one or more users may access the system 102 through one or more user devices 104-2, 104-3 . . . 104-N, collectively referred to as user devices 104, hereinafter, or applications residing on the user devices 104. The system 102 receives the user input from one or more user devices 104. Further, the system 102 may also receive feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, or a cloud-based computing environment. It will be understood that the system 102 may be accessed by multiple users through one or more user devices 104-1, 104-3 . . . 104-N. In one implementation, the system 102 may comprise a cloud-based computing environment in which users may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in existing synthetic data generation systems, the challenges necessitate the need to build the system 102 for multi-agent synthetic data generation. At first, a user may use the user device 104 to access the system 102 via the I/O interface 110. The user may register the user devices 104 using the I/O interface 110 in order to use the system 102. In one aspect, the user may access the I/O interface 110 of the system 102 to input domain-specific requirements and select a scenario type. The detailed functioning of the system 102 is described below with the help of figures.

In some cases, the system may receive user input specifying domain-specific requirements for synthetic data generation. This user input may include parameters such as desired data fields, relationships between fields, and distributional targets. The user input may also include selection of a scenario type, which may be one of Seedless, Seeded, or a combination of Seeded and Knowledge Base (KB).

The system may process and interpret the received user input to configure the synthetic data generation pipeline accordingly. For Seedless scenarios, the system may rely on pre-defined templates and domain knowledge to generate synthetic data without external references. In Seeded scenarios, the system may use the provided seed data as a basis for generating additional synthetic samples. For scenarios involving a combination of Seeded and Knowledge Base, the system may incorporate both seed data and external knowledge sources in the generation process.

In cases where the selected scenario involves the use of a knowledge base, the system may segment and index large documents into smaller chunks. These chunks may be stored in a vector database and/or knowledge graph for efficient retrieval during the generation process. The vector database may allow for fast similarity searches based on semantic embeddings, while the knowledge graph may capture relationships and hierarchies within the domain-specific data.

In some cases, the system may employ various techniques to segment and index large datasets efficiently. For example, when processing a large corpus of medical research papers, the system may use natural language processing techniques to divide each paper into smaller, semantically coherent chunks. These chunks may correspond to individual sections, paragraphs, or even sentences, depending on the granularity required for the specific use case.

The system may utilize text segmentation algorithms, such as TextTiling or TopicTiling, to identify topic boundaries within the documents. These algorithms may analyze lexical cohesion and semantic shifts to determine appropriate segmentation points. For instance, in a medical research paper, the system may identify distinct segments corresponding to the introduction, methodology, results, and discussion sections.

Once the documents are segmented, the system may generate embeddings for each chunk using advanced language models such as BERT, GPT, or domain-specific variants. These embeddings may capture the semantic content of each chunk in a high-dimensional vector space. The system may then index these embeddings in a vector database optimized for similarity search, such as FAISS or Annoy.

In addition to vector embeddings, the system may extract key entities, relationships, and concepts from each chunk using named entity recognition and relation extraction techniques. This structured information may be used to construct a knowledge graph, where nodes represent entities and edges represent relationships between them. For example, in a medical context, the knowledge graph may capture relationships between diseases, symptoms, treatments, and drug interactions.

The system may also implement a hierarchical indexing structure to improve retrieval efficiency. This structure may organize chunks based on their content, allowing for rapid narrowing of the search space during retrieval. For instance, chunks may be first categorized by broad topics (e.g., cardiovascular diseases, oncology, neurology), then further subdivided into more specific subtopics.

To handle updates and maintain the freshness of the indexed data, the system may implement an incremental indexing approach. This approach may allow new documents or updated information to be seamlessly integrated into the existing index without requiring a full reindexing of the entire dataset. The system may use versioning techniques to track changes and ensure that the most up-to-date information is available for retrieval during the synthetic data generation process.

The system may perform partial classification on a subset of the document chunks. This partial classification process may involve applying machine learning algorithms or rule-based systems to categorize the chunks based on their content. The results of this classification may be used to update or refine the existing taxonomy, allowing the system to adapt to new domain-specific information and improve the accuracy of future classifications.

In an example, in a medical knowledge base, the system may initially classify document chunks into broad categories such as "cardiovascular diseases," "respiratory disorders," and "neurological conditions." The Machine Learning (ML) algorithm used for partial classification is trained using a labeled subset of document chunks, where each chunk is annotated with its corresponding category. The ML algorithm processes input features extracted from the text, including word frequencies, semantic embeddings, and domain-specific terminology. During training, the ML algorithm learns to recognize patterns and relationships between textual features and their associated categories, optimizing for classification accuracy through techniques such as gradient descent and backpropagation.

In this scenario, the system may detect a significant number of document chunks discussing the relationship between cardiovascular health and cognitive function. The ML algorithm outputs confidence scores for existing categories along with detected anomalies that don't fit well within the current taxonomy. The outputs are analyzed to identify emerging patterns, such as clusters of documents with similar content but low classification confidence. Based on this analysis, the system may propose a new category or subcategory such as "cardio-cognitive disorders" within the existing taxonomy. The taxonomy update includes creating new classification labels, retraining the ML algorithm with examples of the new category, and adjusting decision boundaries between related categories. This retrained ML model is then deployed to classify future documents, with periodic retraining to incorporate user feedback and validation of the proposed taxonomy changes, ensuring the system continuously improves its classification accuracy for synthetic data generation.

By segmenting, indexing, and partially classifying the knowledge base, the system may create a structured and efficiently searchable repository of domain-specific information. This repository may be leveraged during the synthetic data generation process to ensure that the generated data is grounded in relevant domain knowledge and maintains appropriate contextual relationships.

Further, the system may define a structured schema based on user input. The structured schema may include data fields, relationships between data fields, and distributional targets. The schema definition process may involve analyzing the user-provided requirements and translating them into a formal structure that guides the synthetic data generation.

For example, in a financial dataset scenario, the schema may specify fields such as transaction date, amount, category, and merchant name. The relationships between these fields may be defined, such as constraints on transaction amounts for specific categories or date ranges for certain types of transactions. Distributional targets may be set to ensure the generated data reflects realistic patterns, such as the frequency of different transaction categories or the distribution of transaction amounts.

In some cases, the system may employ meta-learning algorithms to adapt schema structures based on emerging data patterns and domain shifts. This adaptive approach may allow the schema to evolve over time, incorporating new insights and maintaining relevance as the domain knowledge expands or changes.

The meta-learning approach for schema adaptation may involve a two-level learning process. At the base level, the system may learn to generate and refine schemas for specific domains. At the meta-level, the system may learn strategies for efficiently adapting schemas across different domains and data distributions.

The system may utilize gradient-based meta-learning techniques, such as Model-Agnostic Meta-Learning (MAML), to learn a set of initial parameters that can be quickly adapted to new tasks or domains. This approach may allow the system to rapidly adjust schema structures when encountering new data patterns or domain shifts.

In some implementations, the system may employ a memory-augmented neural network architecture to store and retrieve information about previous schema adaptations. This memory component may allow the system to draw upon past experiences when adapting schemas for new domains, potentially improving the efficiency and effectiveness of the adaptation process.

The meta-learning algorithm may incorporate a reinforcement learning framework, where the reward signal is based on the quality and utility of the adapted schema. The system may use metrics such as data consistency, model performance on downstream tasks, and user feedback to evaluate the effectiveness of schema adaptations and guide the learning process.

To handle the dynamic nature of evolving domains, the system may implement an online meta-learning approach. This approach may allow the system to continuously update its meta-knowledge as new data and domain information become available, ensuring that the schema adaptation process remains relevant and effective over time.

The meta-learning algorithm may also incorporate techniques for few-shot learning, enabling the system to adapt schemas effectively even when only a small amount of data is available for a new domain. This capability may be particularly useful when dealing with emerging or rapidly changing domains where extensive data may not be immediately available.

In some cases, the system may use a hierarchical meta-learning approach, where different levels of the hierarchy correspond to different levels of schema abstraction. This hierarchical structure may allow the system to learn and adapt both high-level schema concepts and low-level field-specific details simultaneously.

The meta-learning algorithm may also incorporate techniques for transfer learning, allowing the system to leverage knowledge gained from adapting schemas in one domain to improve adaptation performance in related domains. This transfer of knowledge may help the system generalize its schema adaptation capabilities across a wide range of domains and data types.

To handle complex relationships between schema elements, the system may employ graph neural networks within its meta-learning framework. These networks may allow the system to learn and adapt schemas that capture intricate dependencies and structures within the data, potentially leading to more accurate and flexible schema representations.

The system may validate the structured schema to ensure compliance with domain constraints and resolve any conflicts. This validation process may involve checking for logical consistency between defined relationships, verifying that specified constraints are achievable, and ensuring that the schema aligns with known domain rules and regulations.

In one implementation, the system may classify the input data received. The classification may involve three main components: a multilayer classification module, a taxonomy expansion module, and a knowledge integration module.

The multilayer classification module may be responsible for labeling data and detecting entities and relationships. In some implementations, the module may employ a multi-tiered classification framework that integrates advanced machine learning techniques with structured knowledge representation. This approach may combine neural network-based classifiers, such as convolutional neural networks (CNNs) or recurrent neural networks (RNNs), trained on comprehensive hierarchical taxonomies, with symbolic reasoning methods. The deep learning classifiers may utilize architectures like transformer models or graph neural networks to process and analyze complex input data, extracting high-level features and patterns. These classifiers may be trained on large-scale, domain-specific datasets to recognize and categorize entities, relationships, and categories within the input data. The integration of symbolic knowledge representation may allow for the incorporation of domain expertise and logical rules, potentially enhancing the system's ability to provide interpretable and explainable classifications. This hybrid approach may enable robust, accurate, and transparent detection and categorization of entities, relationships, and categories across various domains and data types.

The taxonomy expansion module may propose new sub-categories to enrich the existing taxonomy. In some cases, this module may incorporate unsupervised learning algorithms for emergent taxonomy discovery, automatically enriching the taxonomy with new categories as the system encounters novel data patterns.

In some alternate implementations and not by way of any limitations, the system may merge the classification results with a knowledge base, enhancing the overall understanding of the data context. In some cases, the knowledge integration module may leverage Bayesian optimization and reinforcement learning for intelligent feature refinement, dynamically refining feature relevance based on real-time domain feedback.

Further, the system may synthesize synthetic data based on the structured schema by applying a hybrid generation approach. This hybrid approach may combine neural template-driven generation with adversarial contrastive sampling to ensure diverse and structured outputs.

The neural template-driven generation may utilize large language models that have been fine-tuned on domain-specific data. The LLMs may generate structured outputs that adhere to the defined schema and maintain semantic coherence within the domain context.

In an embodiment, the system employs Chain of Thought prompting as an advanced technique to enhance the generation of synthetic data by guiding the neural template-driven generation model through a step-by-step reasoning process. Instead of producing synthetic samples in a single step, the model is prompted to articulate intermediate logical steps, dependencies, or data transformations aligned with the structured schema and domain rules. For example, when generating synthetic financial records, the model sequentially reasons through related attributes—such as verifying that transaction dates fall within acceptable periods before assigning amounts and account identifiers—thereby ensuring coherence and consistency in the output. This stepwise reasoning enables the model to handle complex data relationships and constraints more effectively, resulting in synthetic datasets that better mirror real-world distributions and domain-specific nuances. By incorporating Chain of Thought prompting, the system improves the accuracy, interpretability, and validity of the synthetic data generated, supporting downstream machine learning and analytics tasks.

In some implementations, the system may utilize large language models that have been specifically trained and optimized on domain-specific data. These models may leverage advanced neural architectures, such as transformer-based networks, to process and generate structured outputs that adhere to the defined schema and maintain semantic coherence within the domain context. By training on extensive domain-specific datasets, these language models may develop an understanding of the terminology, patterns, and relationships unique to the particular field or industry. This specialized training may enable the models to generate synthetic data that closely mimics the characteristics and intricacies of real-world data in the target domain. For example, in a financial dataset, these domain-optimized language models may generate transaction descriptions that follow typical patterns and use appropriate terminology for different transaction categories, reflecting the specific language and structure commonly found in financial records.

Adversarial contrastive sampling may be employed to introduce diversity into the generated data while maintaining coherence with the defined schema. This technique may involve generating multiple candidate samples and selecting those that maximize diversity while still adhering to the specified constraints and distributional targets. For instance, in generating synthetic customer profiles, adversarial contrastive sampling may ensure a wide range of demographic characteristics while maintaining realistic correlations between attributes.

In generating synthetic financial transaction data, adversarial contrastive sampling may be employed to create diverse yet realistic transaction records. The system may generate multiple candidate transaction samples and select those that maximize diversity while adhering to the defined schema and distributional targets.

For example, the system may generate a set of transaction records including:

1. A high-value electronics purchase from a luxury retailer
2. A series of small-value grocery store transactions
3. A large international wire transfer
4. Multiple ATM withdrawals in different locations
5. A recurring monthly subscription payment
6. An unusual high-value transaction at a typically low-cost merchant The adversarial contrastive sampling process may then select a subset of these transactions that maximizes diversity in transaction types, amounts, and patterns while maintaining realistic correlations. For instance, it may ensure that high-value purchases are less frequent but still present, that recurring payments maintain consistent timing and amounts, and that the overall distribution of transaction values matches expected patterns for the customer demographic.

This approach may result in a synthetic dataset that captures a wide range of transaction scenarios, including both common and rare events, while maintaining coherence with the defined schema and preserving realistic relationships between transaction attributes such as amount, merchant category, time of day, and frequency.

In some cases where the knowledge base is integrated or the scenario type is seeded, the system may perform a retrieval-augmented generation process as part of the synthetic data generation. This process may involve conducting a semantic similarity search within the knowledge base using a vector database. The vector database may allow for efficient retrieval of contextually relevant information based on semantic embeddings of the data being generated.

The retrieval-augmented generation process may also include extracting contextual information through knowledge graph traversal. This traversal may help ground the generated synthetic data in relevant domain context by exploring relationships and hierarchies within the knowledge graph. For example, when generating synthetic medical records, the system may traverse a medical knowledge graph to ensure that generated symptoms, diagnoses, and treatments are consistent with known medical relationships and protocols.

For example, when generating synthetic customer profiles for a financial institution, the system may employ a retrieval-augmented generation process to create realistic and contextually grounded data. The process may begin by conducting a semantic similarity search within the knowledge base using a vector database. For instance, when generating a profile for a high-net-worth individual, the system may query the vector database to retrieve information on typical investment patterns, income sources, and spending behaviors associated with this customer segment. The vector database may efficiently return contextually relevant information, such as common occupation types, preferred investment vehicles, and frequency of international transactions, based on the semantic embeddings of the profile being generated.

The system may then extract additional contextual information through knowledge graph traversal. For example, if the initial profile indicates a preference for sustainable investments, the system may traverse the financial knowledge graph to explore relationships between sustainable investment products, associated risk profiles, and typical portfolio allocations. This traversal may help ground the generated synthetic profile in relevant domain context by ensuring that the investment preferences, risk tolerance, and portfolio composition are consistent with known patterns and regulations in sustainable finance. The resulting synthetic customer profile may include realistic details such as a mix of green bonds, ESG-focused mutual funds, and impact investments, with allocations and risk levels that accurately reflect real-world sustainable investment strategies for high-net-worth individuals.

In some implementations, the system may generate counterfactual data points using causal inference techniques. These techniques may allow the system to model complex causal relationships and explore "what-if" scenarios within the synthetic dataset. For instance, in a dataset modeling economic indicators, the system may generate counterfactual data points that explore the potential effects of policy changes or external economic shocks.

The system may validate the generated synthetic data through local consistency checks. The local consistency checks may ensure attribute coherence and adherence to specified constraints, including date and format consistency. For example, in a dataset containing employee records, the system may verify that hire dates precede termination dates, or that salary figures adhere to specified ranges for different job categories.

In some cases, the system may employ knowledge graph construction from uploaded documents when operating in the Seeded Generation with Knowledge Base mode. This process may involve analyzing the semantic content of the uploaded documents, extracting entities and relationships, and organizing this information into a structured knowledge graph. The resulting knowledge graph may serve as a rich source of domain-specific information to inform the synthetic data generation process.

The Generation Agent may utilize a two-stage retrieval mechanism in some implementations. The first stage may involve a vector database for rapid semantic similarity search. This database may store vector representations of knowledge chunks, allowing for efficient retrieval of contextually relevant information during the generation process. The second stage may employ a knowledge graph traversal engine for extracting more detailed contextual information. This engine may explore the relationships and hierarchies within the knowledge graph to provide deeper context for the generated data.

In the Seeded Mode, the system may use manifold learning techniques for feature extraction. These techniques may help identify underlying structures and patterns in the seed data, allowing for more accurate representation and expansion of the data distribution during the synthetic data generation process. For example, in a dataset of customer behaviors, manifold learning may help identify clusters of similar behaviors, allowing the system to generate synthetic data that maintains these underlying patterns while introducing controlled variability.

In some cases, the system may evaluate the synthetic data by applying statistical tests and performing embedding space analysis to assess semantic quality. This evaluation process may involve multiple steps and techniques to ensure the generated data meets specified quality criteria.

The system may employ distributional tests such as Wasserstein distance and Maximum Mean Discrepancy to compare the statistical properties of the synthetic data with target distributions or real-world reference data. The Wasserstein distance, also known as the Earth Mover's Distance, may measure the minimum cost of transforming one probability distribution into another. This metric may be particularly useful for comparing continuous distributions and capturing differences in both shape and location.

Maximum Mean Discrepancy (MMD) may be used to compare the moments of two distributions in a high-dimensional feature space. MMD may be effective for detecting subtle differences between distributions that might not be apparent in lower-order statistics. In some cases, the system may apply MMD to compare the distribution of synthetic data features with those of a reference dataset, ensuring that the generated data maintains similar statistical properties.

The system may perform embedding space analysis to assess the semantic quality of the synthetic data. This analysis may involve mapping the synthetic and reference data into a high-dimensional embedding space using techniques such as word embeddings for textual data or learned representations for structured data. The system may then compare the distribution and relationships of data points in this embedding space to ensure semantic coherence and diversity.

In some cases, the system may use coverage metrics to ensure comprehensive knowledge utilization. For example, the system may employ a Knowledge Graph Coverage Ratio, which may measure the proportion of entities and relationships from the knowledge graph that are represented in the synthetic data. This metric may help ensure that the generated data reflects a broad range of domain knowledge.

The system may also use a Semantic Density Coverage metric, which may assess the distribution of synthetic data points across different semantic regions of the embedding space. This metric may help identify areas where the synthetic data may be under-representing certain concepts or relationships, allowing for targeted refinement of the generation process.

In evaluating synthetic customer data for an e-commerce platform, the system may apply multiple metrics to assess the quality and fidelity of the generated data.

The system may calculate the Wasserstein distance between the distribution of customer purchase amounts in the synthetic data and a reference dataset. For monthly spending across product categories, the Wasserstein distance may be 0.15, indicating a relatively close match between the synthetic and real distributions. A distance of 0 would represent identical distributions, while larger values indicate greater dissimilarity.

Applying Maximum Mean Discrepancy (MMD) to compare the joint distribution of customer attributes (age, location, purchase frequency), the system may obtain an MMD value of 0.08. MMD values typically range from 0 to 1, with lower values indicating greater similarity. This result suggests that the synthetic data captures the complex relationships between customer characteristics with high fidelity.

In the embedding space analysis, the system may find that 92% of the synthetic customer embeddings fall within the same regions as the reference data embeddings. This high overlap suggests that the synthetic data maintains realistic clusters and relationships between customer types.

The Knowledge Graph Coverage Ratio may be calculated as 0.85, indicating that 85% of the entities and relationships from the e-commerce knowledge graph are represented in the synthetic data. This high coverage suggests comprehensive utilization of domain knowledge in the generated data.

For the Semantic Density Coverage metric, the system may find that 90% of the semantic regions in the embedding space have a synthetic data density within 10% of the reference data density. However, it may identify that the region representing customers with mixed category preferences has only 70% of the expected density, indicating an area for potential refinement in the generation process.

These quantitative metrics provide a comprehensive assessment of the synthetic data's quality, allowing for targeted improvements in the generation process to enhance fidelity and coverage.

In an embodiment, the Analysis Agent may incorporate agent-based data auditing to proactively identify potential biases, anomalies, and inconsistencies in the synthetic data. This auditing process may involve automated checks for statistical outliers, unexpected correlations between features, or violations of domain-specific rules or constraints. When issues are detected, the system may trigger self-correction mechanisms within the pipeline, such as adjusting generation parameters or refining retrieval queries to address the identified problems.

In some cases, the system may use explainable AI techniques to provide insights into the quality assessment process. For example, the system may employ SHAP (SHapley Additive explanations) values to identify which features contribute most significantly to detected anomalies or quality issues. This information may be used to guide targeted improvements in the generation process or to provide transparent explanations of data quality to users.

The evaluation process may be iterative, with the system continuously refining the synthetic data based on the results of these quality assessments. This iterative approach may help ensure that the final synthetic dataset meets specified quality criteria while maintaining statistical fidelity, semantic coherence, and comprehensive coverage of the relevant domain knowledge.

In some cases, the system may perform anomaly detection on the synthetic data using explainable-AI techniques that integrates (i) methods such as SHAP (SHapley Additive explanations) and LIME (Local Interpretable Model-agnostic Explanations) with (ii) advanced reasoning-based approaches, including Chain-of-Thought prompting, LLM-based explanation generation, and other reasoning models. The anomaly detection process enables both local feature-importance analysis and deeper context-aware explanations, thereby improving the identification of subtle anomalies and providing richer insights for targeted refinement.

The SHAP technique may be used to explain individual predictions by computing the contribution of each feature to the prediction. In the context of synthetic data anomaly detection, SHAP values may be calculated for each data point to determine which features contribute most significantly to its classification as an anomaly. For example, in a synthetic dataset of customer transactions, SHAP analysis may reveal that an unusually high transaction amount combined with an atypical time of day are the primary factors contributing to a transaction being flagged as anomalous.

LIME may be employed to explain the predictions of any classifier in an interpretable way. This technique may work by perturbing the input data and seeing how the predictions change. In the synthetic data context, LIME may be used to generate local explanations for why certain data points are considered anomalous. For instance, in a synthetic medical dataset, LIME may explain that a patient record is flagged as anomalous due to an unexpected combination of age, symptoms, and prescribed medications.

Reasoning-based methods such as Chain-of-Thought prompting or LLM explanation generation complement SHAP and LIME by producing multi-step, context-aware rationales that capture higher-order feature interactions and domain logic, enabling the system to detect nuanced or multi-feature anomalies that may be overlooked by purely statistical measures.

The system may use these explainable AI techniques to provide detailed insights into the nature of detected anomalies. These insights may include information about which features or combinations of features are most responsible for the anomalous classification, as well as how changes in these features might affect the classification.

In some cases, the system may use the results of the explainable AI analysis (Insights from both the local (SHAP/LIME) and reasoning-based explanations) to guide targeted refinement of the synthetic data generation process. For example, if SHAP analysis consistently identifies a particular feature as contributing to anomalies, the system may adjust the generation parameters or constraints related to that feature. Similarly, if LIME explanations reveal unexpected relationships between features in anomalous data points, the system may refine its generation models to better capture realistic feature interactions.

The anomaly detection process may also involve comparing the distribution of feature importances in the synthetic data to those in a reference dataset. Significant differences in these distributions may indicate areas where the synthetic data generation process may need adjustment to better reflect real-world patterns.

In some implementations, the system may use the insights from explainable AI techniques to create visualizations that highlight anomalous patterns in the synthetic data. These visualizations may help users understand the nature of detected anomalies and make informed decisions about how to refine the data generation process.

The system may also employ these explainable AI techniques (the combined SHAP/LIME and reasoning-based analysis) in an iterative process, repeatedly analyzing and refining the synthetic data until the frequency and nature of detected anomalies fall within acceptable thresholds. This iterative approach may help ensure that the final synthetic dataset maintains high fidelity to real-world data patterns while minimizing unrealistic or problematic data points.

In an example, an iterative process of refining synthetic financial transaction data, the system may employ SHAP (SHapley Additive explanations) analysis alongside reasoning-based explanations to detect and address anomalies.

Initially, the system generates a set of synthetic transactions. SHAP analysis reveals that 5% of the transactions are flagged as anomalous, with unusually high SHAP values for the "transaction amount" and "time of day" features. Chain-of-Thought explanations further indicate that these anomalies violate typical merchant-category patterns. The system identifies that these anomalies primarily occur in the "dining" category, where large transactions are taking place during early morning hours.

In the first refinement iteration, the system adjusts the generation parameters for dining transactions, implementing tighter constraints on transaction amounts and time distributions. A second round of SHAP analysis shows the anomaly rate has decreased to 3%, but now highlights an unexpected correlation between customer age and frequency of high-value electronics purchases. Reasoning-based explanations suggest a missing demographic-purchase dependency.

The system further refines its generation model, incorporating relationships between customer demographics and purchasing patterns. After this iteration, SHAP analysis indicates that the anomaly rate has fallen to 1.5%, with no single feature contributing disproportionately to the remaining anomalies. LLM explanations confirm that remaining anomalies correspond to rare but plausible edge cases.

In a final iteration, the system fine-tunes the generation process to address minor inconsistencies in the distribution of transaction locations. The resulting SHAP analysis shows that the anomaly rate has stabilized at 1%, with the nature and distribution of these anomalies closely matching those observed in the real-world reference data. Reasoning-based diagnostics concur, indicating no further high-priority refinements are needed.

This iterative process, guided by explainable AI techniques, results in a synthetic dataset that closely mimics real-world transaction patterns while minimizing unrealistic or problematic data points.

Further to performing anomaly detection, the system may re-synthesize the synthetic data upon detection of anomalies or when the quality of the synthetic data falls below a defined threshold. This re-synthesis process may involve adjusting various parameters and constraints to iteratively refine the data until it meets the desired quality criteria.

For seeded and combination scenario types, the re-synthesis process may begin with adjusting retrieval queries used in the generation process. For example, if the synthetic data lacks diversity in certain areas, the system may modify the retrieval queries to access a broader range of relevant information from the knowledge base. This adjustment may help introduce more varied and representative data points into the synthetic dataset.

In some cases, the system may modify constraints used in the data generation process. These constraints may include rules governing the relationships between different data fields, acceptable value ranges, or distributional targets. By adjusting these constraints, the system may address specific issues identified during the anomaly detection or quality assessment phases. For instance, if the synthetic data shows unrealistic correlations between certain variables, the system may tighten or relax relevant constraints to produce more accurate relationships.

The re-synthesis process may involve re-running relevant steps in the synthetic data generation process. This may include re-executing the generation, analysis, and validation stages with the adjusted parameters and constraints. By iteratively refining the data through multiple passes of the generation pipeline, the system may progressively improve the quality and fidelity of the synthetic dataset.

In some implementations, the system may incorporate feedback from domain experts through human-in-the-loop validation interfaces. These interfaces may allow experts to review samples of the synthetic data, provide feedback on its quality and realism, and suggest specific areas for improvement. The system may use this expert feedback to further refine its generation strategies and validation criteria, ensuring that the synthetic data aligns closely with domain-specific requirements and expectations.

The iterative refinement process may continue until the synthetic data meets predefined quality thresholds or until a maximum number of iterations is reached. This approach may help ensure that the final synthetic dataset is of high quality and suitable for its intended use.

In some cases, the final synthetic dataset produced through this iterative refinement process may be domain-grounded, privacy-compliant, and ready for machine learning training, testing, and analysis. The domain-grounding may be achieved through the use of domain-specific knowledge bases and expert feedback during the generation and refinement processes. Privacy compliance may be ensured through techniques such as differential privacy or the removal of personally identifiable information during the data synthesis process.

The system may perform adversarial validation and robustness testing to assess the synthetic data against edge cases. This testing may involve generating challenging or unusual scenarios that the synthetic data might encounter in real-world applications. For example, in a financial dataset, the system may test how well the synthetic data represents rare but significant events such as market crashes or sudden policy changes.

Robustness testing may involve evaluating how well machine learning models trained on the synthetic data perform on real-world datasets or in simulated deployment scenarios. This testing may help identify any weaknesses or biases in the synthetic data that could impact the performance of models trained on it.

By conducting these validation and testing procedures, the system may ensure that the synthetic dataset is ready for deployment in real-world machine learning applications. This readiness may be characterized by the dataset's ability to support the training of models that generalize well to unseen data and perform robustly across a wide range of scenarios, including edge cases.

The combination of iterative refinement, domain expert feedback, and rigorous testing may result in a high-quality synthetic dataset that closely mimics the statistical properties and semantic relationships of real-world data while maintaining privacy and supporting effective machine learning applications.

Referring now to FIG. 2, a method 200 for generating synthetic data is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for generating synthetic data. Additionally, individual blocks may be deleted from the method 200 without departing from the scope of the subject matter described herein. Furthermore, the method 200 for generating synthetic data can be implemented in any suitable hardware, software, firmware, or combination thereof. In some implementations, the method 200 may be executed by a system comprising one or more processors and memory storing instructions that, when executed by the one or more processors, cause the system to perform the operations of the method 200.

At block 202, a method for generating synthetic data may include receiving user input specifying domain-specific requirements for synthetic data generation and selecting a scenario type. The scenario type may be one of Seedless, Seeded, or a combination of Seeded and Knowledge Base (KB).

At block 204, a structured schema may be defined based on the user input. This structured schema may include data fields, relationships between data fields, and distributional targets.

At block 206, the method may include synthesizing synthetic data based on the structured schema. This synthesis may apply a hybrid generation approach, combining neural template-driven generation with adversarial contrastive sampling to ensure diverse and structured outputs.

At block 208, the method may involve evaluating the synthetic data by applying statistical tests and performing embedding space analysis to assess semantic quality. This evaluation process may help ensure the generated data meets specified quality criteria.

At block 210, the method may include performing anomaly detection on the synthetic data using explainable AI techniques. These techniques may comprise one or more of SHAP (SHapley Additive explanations) or LIME (Local Interpretable Model-agnostic Explanations) alongside reasoning-based explanations. The anomaly detection process may help identify gaps or inconsistencies in the synthetic data and provide insights for targeted refinement.

At block 214, the method may involve re-synthesizing the synthetic data upon detection of anomalies or when the quality of the synthetic data falls below a defined threshold (shown in block 212). This re-synthesis process may generate a final synthetic dataset (shown in block 216) that meets the desired quality criteria.

In some implementations, the method may include segmenting and indexing large documents into smaller chunks when the selected scenario involves the use of a knowledge base. These chunks may be stored in a vector database and/or knowledge graph for efficient retrieval during the generation process.

The method may involve performing partial classification on a subset of the chunks, allowing for updates to a taxonomy based on the domain-specific data. This classification process may help refine and expand the knowledge base over time.

In some cases, the method may include validating the structured schema to ensure compliance with domain constraints and resolving any conflicts. This validation process may help maintain the integrity and consistency of the generated synthetic data.

The method may involve classifying input data into entities, relationships, and categories based on the defined schema using a multi-layered classification system when the selected scenario is one of Seeded or combination. This classification process may help organize and structure the input data for more effective synthetic data generation.

In some implementations, the method may include performing a retrieval-augmented generation process. This process may involve conducting a semantic similarity search within the knowledge base using a vector database, and extracting contextual information through knowledge graph traversal to ground the generated synthetic data in relevant domain context.

The method may involve generating counterfactual data points using causal inference techniques to model complex causal relationships and explore "what-if" scenarios. This approach may enhance the diversity and realism of the generated synthetic data.

In some cases, the method may include validating the generated synthetic data through local consistency checks, ensuring attribute coherence and adherence to specified constraints, including date and format consistency. These checks may help maintain the quality and reliability of the synthetic data.

The method may produce a final synthetic dataset that is domain-grounded, privacy-compliant, and ready for machine learning training, testing, and analysis. This dataset may be suitable for various applications in data science and artificial intelligence.

In some implementations, the method may include performing adversarial validation and robustness testing to assess the synthetic data against edge cases, ensuring its readiness for deployment in real-world machine learning applications. These testing procedures may help identify and address potential weaknesses or biases in the synthetic data.

In an embodiment, the processor functions as an AI agent, wherein the processor is configured to execute the machine-learning models trained for document classification, chunking, embedding generation, and retrieval-based optimization. The term "AI agent" as used herein refers to the set of processing functionalities performed by the processor.

The AI agent's capabilities are implemented through a set of machine-learning models stored in memory, executed by the processor, and adapted based on document structures, user-defined preferences, and retrieval effectiveness scores. In certain embodiments, the processor may be configured to interface with external retrieval-augmented generation (RAG) applications, wherein retrieved document chunks undergo continuous ranking adjustments and re-segmentation refinements based on evolving query patterns.

Accordingly, the processor and the AI agent may be considered functionally analogous, wherein the processor serves as the hardware execution platform, and the AI agent represents the adaptive, machine-learning-driven operations performed by the processor.

Figure 3:
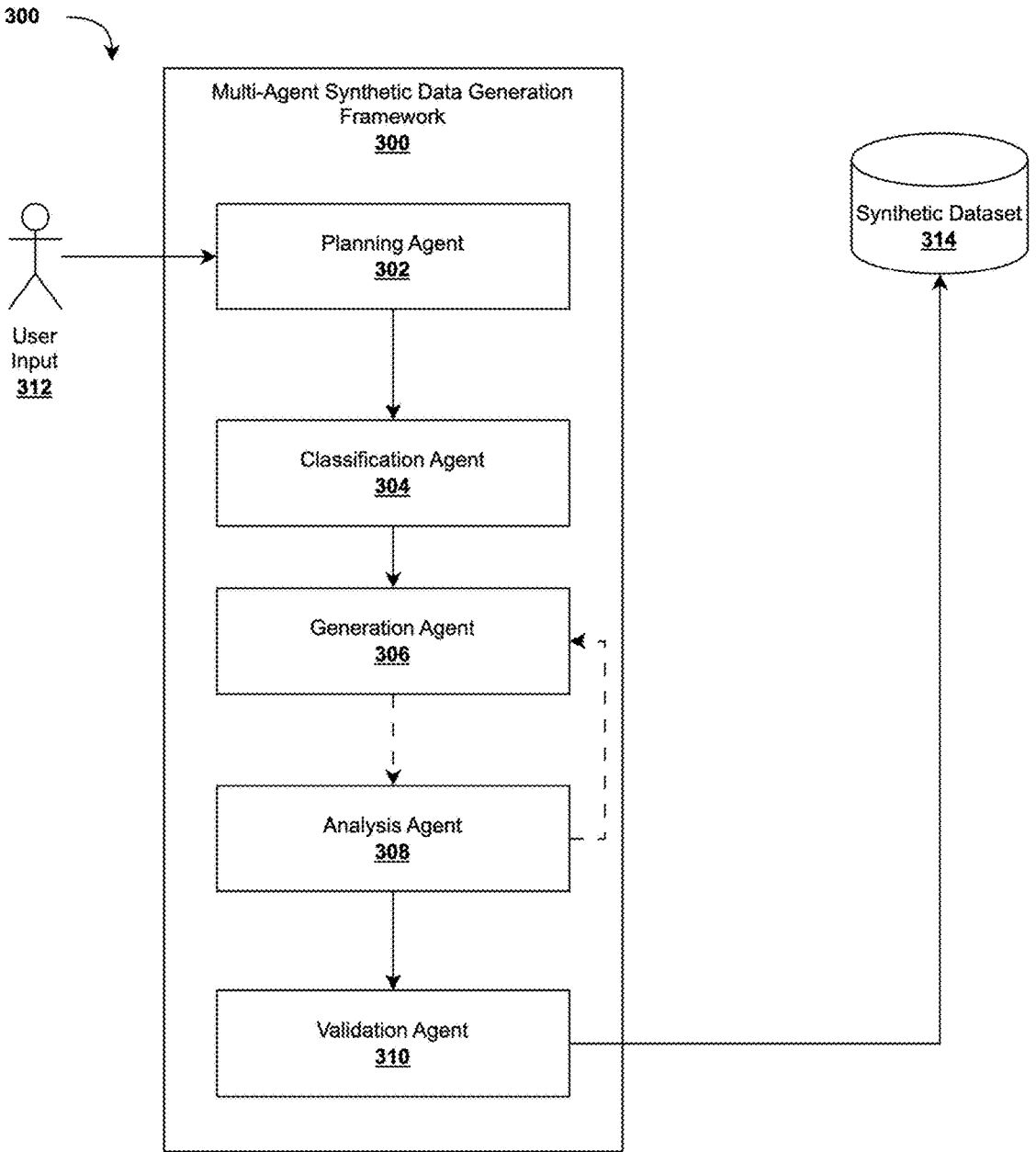
FIG. 3 illustrates a block diagram of a multi-agent synthetic data generation framework, in accordance with an embodiment of the present subject matter.

FIG. 3 illustrates a synthetic data framework 300 for generating high-quality synthetic datasets. The synthetic data framework 300 incorporates a multi-agent architecture designed to process and refine data through various specialized stages.

The synthetic data framework 300 begins with a user input 312, which may include parameters, constraints, or seed data for the generation process. A planning agent 302 receives the user input 312 and formulates an initial strategy for data generation based on the provided information.

From the planning agent 302, the process flows to a classification agent 304. The classification agent 304 may analyze and categorize the input data, preparing it for the subsequent generation phase.

A generation agent 306 follows the classification agent 304 in the pipeline. The generation agent 306 may create synthetic data points based on the classified and processed input.

An analysis agent 308 receives the output from the generation agent 306. The analysis agent 308 may evaluate the quality and characteristics of the generated data, ensuring it meets specified criteria. The analysis agent may track a Coverage Ratio to ensure comprehensive representation of various aspects or subdomains within the generated synthetic data. When the Coverage Ratio falls below a specified threshold for certain categories, the Analysis Agent may trigger targeted regeneration (to the Generation Agent 306) or adjustment of the synthetic data to improve coverage in underrepresented areas.

A validation agent 310 serves as the final checkpoint in the synthetic data framework 300. The validation agent 310 may perform additional checks to verify the integrity and usability of the synthetic data.

The output of the validation agent 310 culminates in a synthetic dataset 314, which represents the final product of the synthetic data framework 300.

In some cases, the synthetic data framework 300 may incorporate three usage scenarios: Seedless Mode, Seeded Mode, and Seeded Generation with Knowledge Base. Each scenario may have specific configurations for schema definition, retrieval augmentation, and final validation. These scenarios may allow the synthetic data framework 300 to adapt to various data generation needs and input types.

The synthetic data framework 300 may employ iterative feedback loops orchestrated via a central controller. This controller may monitor multiple objectives simultaneously, including statistical fidelity, semantic diversity, privacy compliance, and coverage. By continuously evaluating these metrics, the synthetic data framework 300 may refine and improve the quality of the generated data throughout the process.

Figure 4:
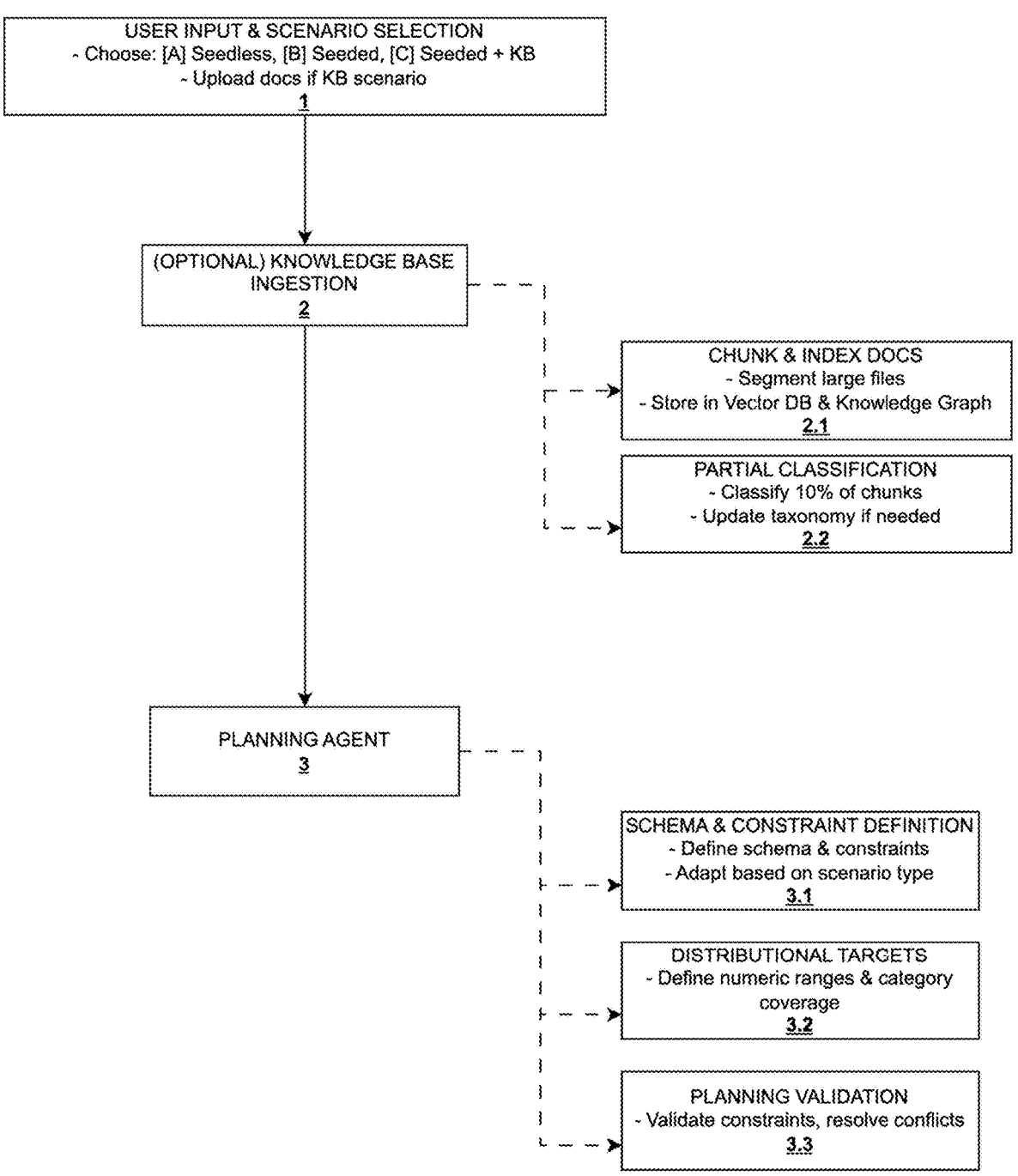
FIGS. 4-6 illustrates a framework for synthetic data generation, in accordance with an embodiment of the present subject matter.

FIG. 4 illustrates a method for synthetic data generation within the synthetic data framework 100. The method begins with user input and scenario selection 1, where the user is asked to choose from three options: [A] Seedless, where no pre-existing knowledge base (KB) is used; [B] Seeded, where an initial knowledge base is available; and [C] Seeded+KB, which involves using both a seeded knowledge base and additional external documents. If the chosen scenario involves a knowledge base, the user is prompted to upload relevant documents. The next step, which is optional, involves knowledge base ingestion 2. In this phase, large documents are segmented into smaller chunks, which are then indexed and stored 2.1 in a Vector Database and/or Knowledge Graph. Additionally, a partial classification 2.2 process is performed on approximately 10% of the chunks, allowing for updates to the taxonomy if needed.

Following this, the process moves to the Planning Agent 3, which plays a key role in defining the structure and constraints for the process. The planning agent begins by defining the schema and constraints 3.1, adapting these based on the selected scenario type. It then sets distributional targets 3.2, defining numeric ranges and category coverage to guide the processing towards specific goals. Finally, the planning agent validates the defined constraints 3.3, ensuring that all requirements are met and resolving any conflicts that may arise. This structured method allows for tailored document processing and planning, depending on the scenario and available resources.

Figure 5:
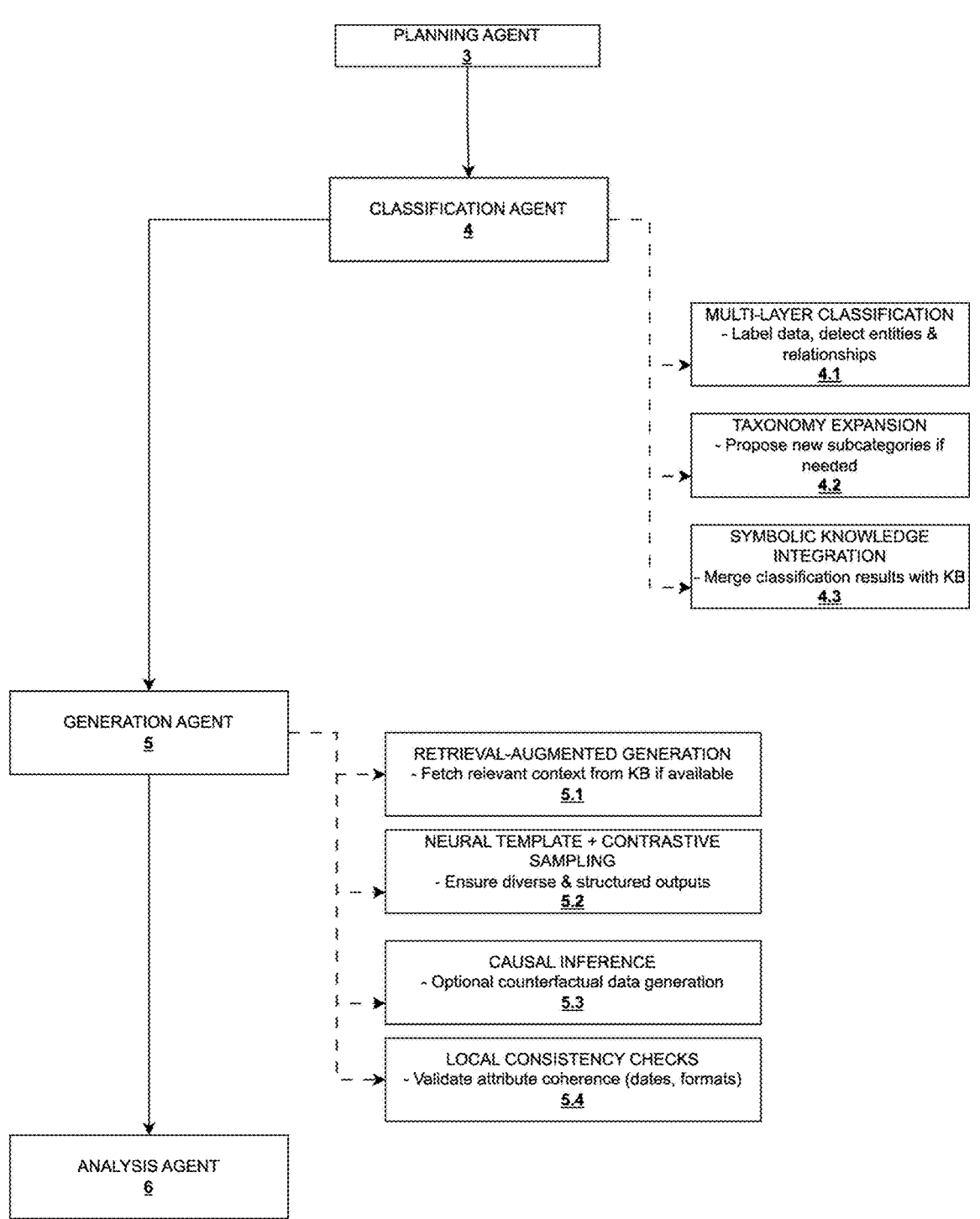
Figure 6:
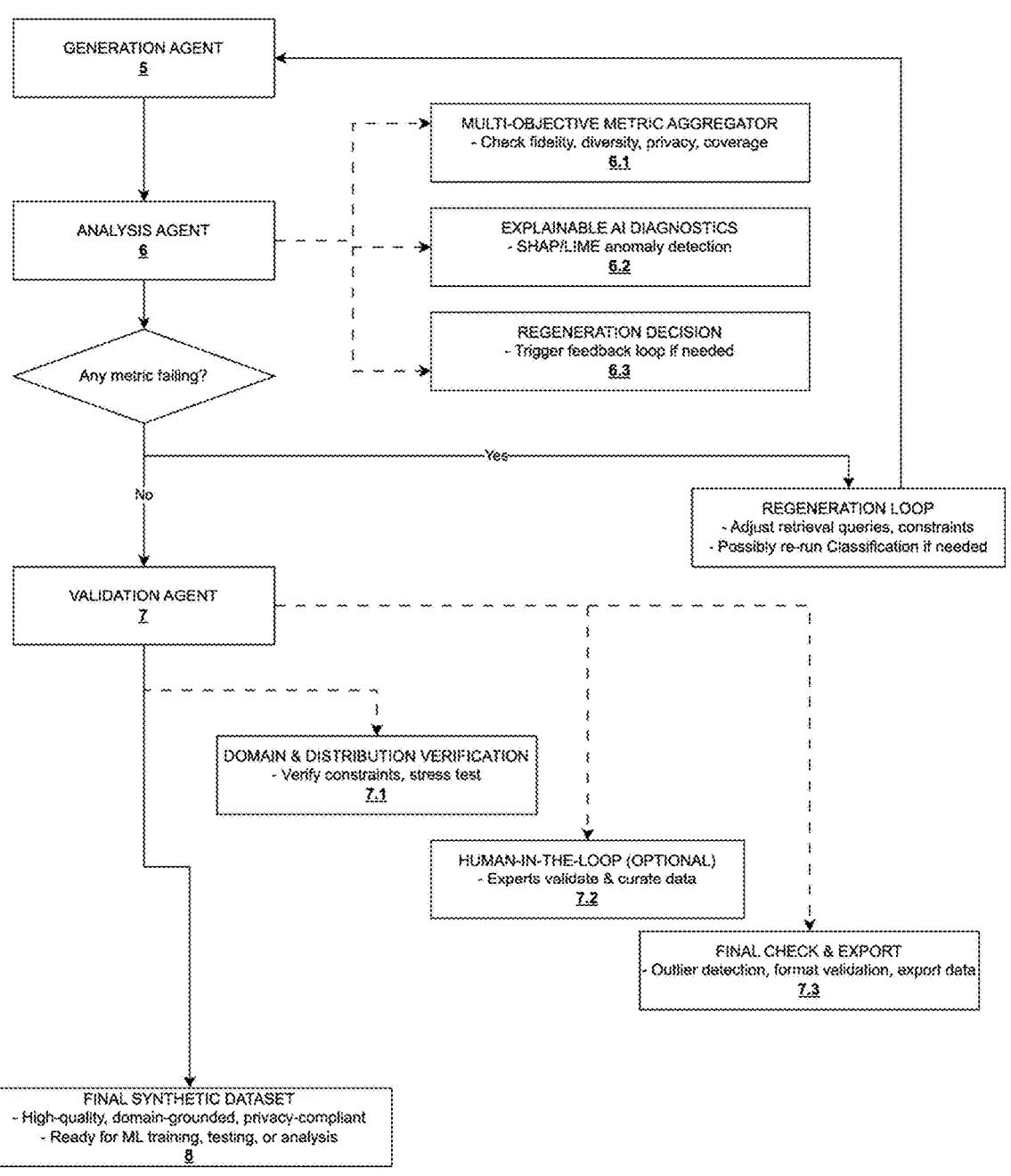

It is important to note that FIG. 4, along with FIG. 5 and FIG. 6, form a complete flowchart of the synthetic data framework 100. For better understanding and clarity, the flowchart is broken down into multiple parts. Furthermore, the agents described in FIG. 3 are the same as those in FIG. 4, FIG. 5, and FIG. 6. The different numbering does not indicate that the agents are different.

In some cases, the planning agent 3 may employ advanced semantic analysis and user intent understanding to interpret the user input 112 and domain requirements. The planning agent 3 may construct a structured schema, utilizing rule-based constraints and probabilistic models to define the schema and complex attribute dependencies and distributional targets.

The planning agent 3 may incorporate meta-learning algorithms to enable autonomous schema evolution based on emerging data patterns and domain shifts. This feature may ensure long-term adaptability of the synthetic data framework 100.

The method may allow for different processing paths depending on the selected scenario type. When knowledge base scenarios are selected, the method 1 may incorporate document processing capabilities, with steps for segmenting large files and storing information in vector databases and knowledge graphs.

FIG. 5 illustrates a system diagram of the synthetic data framework 100, focusing on the interconnections between a classification agent 4, a generation agent 5, and an analysis agent 6. The classification agent 4 may be connected to the planning agent 3, receiving input for further processing.

From the planning agent 3, the process may flow to the classification agent 4, which may analyze and categorize the input data. The classification agent 4 may incorporate three modules: a multilayer classification module 4.1, a taxonomy expansion module 4.2, and a knowledge integration module 4.3. The multilayer classification module 4.1 may be responsible for labeling data and detecting entities and relationships. In some cases, the multilayer classification module 4.1 may utilize a multi-layered classification system, combining deep learning classifiers trained on proprietary hierarchical taxonomies with symbolic knowledge representation. This approach may enable robust and explainable entity, relationship, and category detection.

The taxonomy expansion module 4.2 may propose new subcategories to enrich the existing taxonomy. In some cases, the taxonomy expansion module 4.2 may incorporate unsupervised learning algorithms for emergent taxonomy discovery, automatically enriching the taxonomy with new categories as the system encounters novel data patterns.

The knowledge integration module 4.3 may merge classification results with a knowledge base, enhancing the overall understanding of the data context. In some cases, the knowledge integration module 4.3 may leverage Bayesian optimization and reinforcement learning for intelligent feature refinement, dynamically refining feature relevance based on real-time domain feedback.

The classification agent 4 may connect to the generation agent 5, which contains four modules: a retrieval generation module 5.1, a neural template module 5.2, a causal inference module 5.3, and a consistency check module 5.4.

The retrieval-augmented generation module 5.1 may fetch relevant context from a knowledge base when available. In some cases, the retrieval-augmented generation module 5.1 may employ a two-stage retrieval mechanism: a vector database for rapid semantic similarity search within the domain knowledge base, and a knowledge graph traversal engine for extracting contextual information.

The neural template+contrastive sampling module 5.2 may ensure diverse and structured outputs. In some cases, the neural template module 5.2 may pioneer a hybrid generation approach, combining neural template-driven generation with adversarial contrastive sampling for high-quality synthetic data synthesis.

The causal inference module 5.3 may perform optional counterfactual data generation. In some cases, the causal inference module 5.3 may integrate causal inference techniques to enable the synthesis of counterfactual data points and generate datasets that model complex causal relationships within the domain.

The local consistency check module 5.4 may validate attribute coherence, including dates and formats, ensuring the generated data maintains internal consistency and adheres to specified constraints.

The generation agent 5 may connect to the analysis agent 6, which may evaluate the quality and characteristics of the generated data. The connections between components are shown through solid lines indicating direct data flow, while dashed lines may represent optional or parallel processes between modules.

FIG. 6 illustrates a flowchart of the synthetic data generation process within the synthetic data framework 100. The process begins with the generation agent 5, which connects to an analysis agent 6.

The analysis agent 6 may evaluate the quality and characteristics of the generated data, ensuring it meets specified criteria. The analysis agent 6 incorporates three modules: a step 6.1, a step 6.2, and a step 6.3. The step 6.1 may be a multi-objective metric aggregator module that checks fidelity, diversity, privacy, and coverage of the generated data. In some cases, the analysis agent 6 may employ advanced distributional tests, such as Wasserstein distance and Maximum Mean Discrepancy, and perform embedding space analysis to assess statistical and semantic quality.

The step 6.2 may be an explainable AI diagnostics module that performs anomaly detection using techniques such as SHAP (SHapley Additive explanations) or LIME (Local Interpretable Model-agnostic Explanations) or reasoning-based methods (not shown in FIG. 6) comprising Chain-of-Thought prompting or LLM explanation generation. In some cases, the analysis agent 6 may integrate these explainable AI methods to identify reasons for detected gaps or inconsistencies, providing insights for targeted refinement.

The step 6.3 may be a regeneration decision module that determines whether to trigger a feedback loop. In some cases, the analysis agent 6 may function as an autonomous data auditor, proactively identifying potential biases, anomalies, and inconsistencies, and triggering self-correction mechanisms within the pipeline.

From the analysis agent 6, the process flows to a decision point labeled "Any metric failing?" If the answer is "Yes," the process moves to a regeneration loop that adjusts retrieval queries and constraints, and may re-run the classification agent 4 if needed. This regeneration loop may be connected back to the generation agent 5, allowing for iterative refinement of the synthetic data. If the answer is "No," the process continues to a validation agent 7.

The validation agent 7 may perform additional checks to verify the integrity and usability of the synthetic data before it is output as the synthetic dataset 8.

The system diagram depicts a flow where data moves from the planning agent 102 through classification and generation stages before reaching analysis. The modules within each agent may perform specific functions related to data processing, generation, and validation, collectively contributing to the creation of high-quality synthetic datasets.

The validation agent 7 contains three components: a step 7.1, a step 7.2, and a step 7.3. The step 7.1 may be a domain and distribution verification module that verifies constraints and performs stress testing. In some cases, the validation agent 7 may execute multi-tiered quality assurance, incorporating domain constraint validation, distribution accuracy checks, and verification methods for adherence to specifications.

The step 7.2 may be a human-in-the-loop module that allows experts to validate and curate data. In some cases, the validation agent 7 may include interfaces for human-in-the-loop validation, allowing domain experts to provide feedback and refine generation strategies and validation criteria based on human insights.

The step 7.3 may be a final check and export module that performs outlier detection, format validation, and exports data. In some cases, the validation agent 7 may employ adversarial validation techniques and stress tests to assess the dataset against edge cases to ensure deployment-readiness.

The process concludes with the creation of a synthetic dataset 8. In some cases, the synthetic dataset 8 may be described as high-quality, domain-grounded, privacy-compliant and ready for machine learning training, testing, or analysis.

The flowchart in FIG. 6 shows connections through solid lines for direct process flow and dashed lines for optional or parallel processes. The process incorporates multiple validation and verification steps between the generation and final output stages, ensuring the creation of a robust and reliable synthetic dataset 8.

In some cases, synthetic data generation may address challenges associated with limited availability of real-world datasets, particularly in sensitive domains such as healthcare, finance, and law. Traditional approaches to synthetic data generation may face difficulties in simultaneously maintaining statistical fidelity, diversity, and real-world grounding. These limitations may result in generated data that does not generalize well or that introduces unrealistic patterns.

The present disclosure describes a multi-agent, retrieval-augmented approach to synthetic data generation. This approach may iteratively synthesize high-fidelity data that mirrors the distributional properties of real-world datasets while preserving privacy. In some cases, this method may allow organizations to overcome data scarcity issues without compromising quality or realism, potentially enabling the development of robust and ethically comply enabling the development of robust and ethically compliant AI models.

The disclosed system may leverage the reasoning capabilities of Large Language Models (LLMs) to create specialized agents. These agents may execute targeted tasks such as dynamic query formulation, semantic analysis, and retrieval-augmented synthesis. In some implementations, the agents may engage in self-refinement through iterative feedback loops. This integration may enhance the system's robustness and adaptability, potentially ensuring that synthetic data generation remains accurate, diverse, and contextually grounded across various domain-specific scenarios.

In contrast to existing solutions that may rely on single-pass generative models, the present disclosure describes a multi-stage approach. This approach may incorporate iterative refinement and multi-stage validation, potentially leading to improved realism and diversity in the generated data. The multi-agent workflow described herein may allow for specialized focus on different aspects of the generation process, such as planning, classification, validation, and analysis.

The system may employ robust retrieval-augmentation techniques, integrating real-world or domain-specific information in multiple passes. This approach may help ground the generated synthetic data in relevant domain context, potentially reducing the occurrence of unrealistic or inconsistent data points. The framework may offer dynamic schema adaptation and domain-specific constraints, potentially making it suitable for complex or regulated domains.

In some implementations, the system may incorporate three distinct usage scenarios for synthetic data generation: Seedless Mode, Seeded Mode, and Seeded Generation with Knowledge Base. Each scenario may have specific configurations for schema definition, retrieval augmentation, and final validation.

In the Seedless Mode, users may provide high-level directives defining conceptual intent. The planning agent may derive a schema from its internal knowledge and domain templates, performing domain-informed schema setup. The generation workflow in this mode may involve knowledge-graph driven generation and latent space sampling. The classification agent may operate minimally, ensuring internal schema consistency, while the generation agent may leverage the schema and domain knowledge to sample from latent semantic spaces and synthesize data grounded in domain principles. This mode may be particularly useful for rapid prototyping, conceptual testing, and creating synthetic benchmarks for algorithms in new domains where real data is scarce.

For the Seeded Mode, users may upload limited exemplars that act as distribution anchors for the expanded dataset. The planning agent may analyze these exemplars, extracting features and distributions using manifold learning techniques. The classification agent may perform semantic annotation, assigning domain taxonomy labels and enriching them with knowledge graph embeddings. The generation workflow in this mode may focus on exemplar-guided generation with controlled variability. The generation agent may expand the seed set while preserving semantic fidelity, using constrained contrastive sampling and template transformations to inject variability in a controlled manner. This mode may be particularly useful for augmenting limited real-world datasets for model training, bootstrapping datasets, and maintaining data continuity while adding diversity.

In the Seeded Generation with Knowledge Base scenario, users may upload unstructured knowledge documents. The system may perform semantic indexing and structuring to create a queryable domain knowledge base. The planning agent may adapt schemas based on domain signals from the knowledge base, and user requests may be interpreted in the context of this knowledge base. During generation, a context-aware retrieval engine may retrieve relevant knowledge chunks via knowledge graph traversal. These chunks may contextually condition generation, guiding schema, constraints, and data synthesis to ensure semantic grounding. The system may use coverage metrics such as Knowledge Graph Coverage Ratio and Semantic Density Coverage to ensure comprehensive knowledge utilization. Validation in this mode may include knowledge coherence checks and domain consistency assessments. This scenario may be particularly useful for creating grounded datasets for question answering, domain-specific NLP, and generating structured data from policy documents, legal texts, or manuals.

By offering these three distinct usage scenarios, the system may adapt to various data generation needs and input types, providing flexibility and customization in the synthetic data generation process.

In some implementations, the system may employ a multi-objective optimization approach throughout the synthetic data generation pipeline. This approach may involve iterative feedback loops orchestrated via a central controller that monitors multiple objectives simultaneously, ensuring the generated synthetic data meets various quality criteria.

The system may continuously evaluate statistical fidelity of the synthetic data. The analysis agent may compare synthetic data statistics, such as event frequencies and numeric distributions, against user-defined or real-data references. In some cases, the system may employ statistical tests such as Chi-Square or Kolmogorov-Smirnov (KS) tests to detect significant divergences. If such divergences are detected, the central controller may instruct the generation agent to adjust various parameters. These adjustments may include modifying the sampling temperature, increasing template variety, or refining retrieval specificity to improve the statistical match between synthetic and reference data.

To ensure semantic diversity in the generated data, the system may compute embedding-based distances between synthetic data points. This approach may help prevent the data space from collapsing into a narrow band of samples, which could limit the usefulness of the synthetic data for downstream tasks. If the system detects low diversity, it may implement various strategies to broaden the range of generated data. These strategies may include expanding retrieval queries to access a wider range of information, sampling from less-used templates to introduce more variety, or increasing the contrastive sampling coefficient to encourage greater differentiation between generated samples.

The system may incorporate privacy compliance measures to protect sensitive information. In some implementations, the system may apply differential privacy techniques to add controlled noise to aggregate statistics derived from the data, helping to prevent the identification of individuals. The system may also perform real-time checks for textual leaks of sensitive tokens, ensuring that personally identifiable information is not inadvertently included in the synthetic data. In some cases, the pipeline may include pattern-matching capabilities to identify known sensitive data formats, such as ID patterns, and automatically mask or remove them from the final dataset.

To ensure comprehensive coverage of the domain knowledge, the system may track a "Coverage Ratio" when operating with a large knowledge base. This ratio may represent the proportion of the knowledge base that is reflected in the generated data. If the coverage falls below a specified threshold, such as 60%, the system may trigger an "under-represented chunk retrieval" process. This process may involve actively seeking out and incorporating information from less-represented areas of the knowledge base, ensuring that the final synthetic dataset reflects a broad variety of domain concepts and relationships.

By continuously monitoring and optimizing these multiple objectives, the system may iteratively refine the synthetic data generation process. This approach may help ensure that the resulting synthetic dataset maintains high statistical fidelity, exhibits semantic diversity, complies with privacy requirements, and provides comprehensive coverage of the relevant domain knowledge. The multi-objective optimization process may enable the system to produce synthetic data that closely mimics the characteristics of real-world data while addressing various quality and usability criteria.

In some cases, the system may employ adaptive regeneration logic to iteratively refine the synthetic data generation process. This approach may allow the system to dynamically adjust its parameters in response to the quality assessment of the generated data.

If any of the monitored objectives fails to meet specified criteria, the system may modify one or more generation parameters. These parameters may include, but are not limited to, retrieval depth, sampling temperature, and allowed chunk repetition. After adjusting these parameters, the system may loop back to the Generation and Analysis steps, re-executing the data generation process with the updated settings.

Each iteration of this regeneration process may involve a comprehensive re-evaluation of the updated dataset against all defined objectives. This iterative refinement may continue until user-defined thresholds for data quality are satisfied or until a maximum number of iterations is reached. The user-defined thresholds may encompass various aspects of data quality, such as statistical fidelity, semantic diversity, privacy compliance, and domain coverage.

In cases where the quality criteria are not met within the specified number of iterations, the system may implement more advanced refinement strategies. These strategies may include automatically refining prompts used in the generation process, adjusting retrieval steps to access different or additional information from the knowledge base, or modifying sampling strategies to introduce greater variability in the generated data.

The adaptive regeneration logic may enable the system to progressively improve the quality of the synthetic dataset, striving to meet user-defined thresholds for realism and diversity. This approach may help ensure that the final synthetic dataset closely mimics the characteristics of real-world data while maintaining the desired balance between various quality metrics.

In some cases, the synthetic data generation system may be applied across various domains to address data scarcity and privacy concerns while enabling the development of robust machine learning models. The system may find applications in healthcare, finance, law, and other fields where access to real-world data may be limited or restricted.

In the healthcare domain, the system may generate synthetic patient records for research and analysis purposes. These synthetic records may mimic the statistical properties and relationships found in real patient data while preserving individual privacy. For example, the system may create synthetic electronic health records (EHRs) that include patient demographics, medical histories, laboratory results, and treatment outcomes. These synthetic EHRs may be used to train machine learning models for tasks such as disease prediction, treatment recommendation, or resource allocation without exposing sensitive patient information.

In finance, the system may generate synthetic transaction data for fraud detection and risk assessment. The synthetic data may capture complex patterns and relationships found in real financial transactions while maintaining privacy and regulatory compliance. For instance, the system may create synthetic credit card transaction datasets that include transaction amounts, merchant categories, timestamps, and geographical information. These datasets may be used to develop and test fraud detection algorithms or to assess credit risk models without compromising customer privacy.

In the legal domain, the system may generate synthetic case data for legal research and analysis. The synthetic data may reflect the structure and content of real legal cases while anonymizing sensitive information. For example, the system may create synthetic court records that include case types, legal arguments, judgments, and relevant statutes. These synthetic records may be used to train natural language processing models for legal document analysis or to develop predictive models for case outcomes without exposing confidential case details.

In some cases, the system may implement differential privacy layers or real-time checks for textual leaks of sensitive tokens. These privacy-preserving mechanisms may help ensure that the generated synthetic data does not inadvertently reveal information about individuals in the original dataset. For example, in healthcare applications, the system may apply differential privacy techniques to add controlled noise to aggregate statistics derived from patient data. This approach may allow for meaningful analysis of population-level health trends while protecting individual patient privacy.

The system may also be applied in scenarios where data sharing between organizations is restricted due to privacy regulations or competitive concerns. For instance, in collaborative research projects between multiple healthcare institutions, the system may generate synthetic datasets that capture the essential characteristics of each institution's data without revealing patient-specific information. This approach may enable cross-institutional analysis and model development while maintaining compliance with data protection regulations.

In the field of autonomous vehicle development, the system may generate synthetic driving scenarios to supplement real-world test data. These synthetic scenarios may include rare or dangerous situations that are difficult to capture in real-world testing. For example, the system may create synthetic datasets of traffic patterns, weather conditions, and pedestrian behaviors. These datasets may be used to train and validate autonomous driving algorithms, enhancing their ability to handle a wide range of potential situations without compromising the privacy of individuals captured in real-world driving data.

In some cases, the system may be used to generate synthetic social media data for sentiment analysis and trend prediction. The synthetic data may capture the structure and patterns of real social media posts while avoiding the use of actual user-generated content. This approach may allow for the development and testing of social media analysis algorithms without infringing on user privacy or violating platform terms of service.

In some implementations, the system may be applied to generate synthetic data for specific scenarios, such as personal finance. For example, a user may provide inputs including a small seed set of 50 real data entries (e.g., short text queries or SQL statements), domain constraints (e.g., transaction types, currency formats, permissible date ranges), and diversity goals (e.g., balanced distribution across transaction categories). The planning agent may interpret these domain constraints, defining a schema (e.g., {Date, Amount, Category}) and target distribution (e.g., 25% "Groceries", 25% "Bills", etc.). The classification agent may then identify entities like merchant names, transaction categories, and user attributes from the seed set. The generation agent may use retrieval-augmented generation to gather typical transaction descriptors from similar financial contexts and synthesize new transaction records adhering to the user's domain rules. The analysis agent may check if the newly generated data has the desired distribution and score semantic diversity. Finally, the validation agent may remove low-quality or statistically outlier records, ensuring the final dataset remains realistic yet sufficiently diverse. This process may result in a synthetic dataset of hundreds or thousands of transactions that preserve statistical fidelity, privacy, and domain relevance, suitable for various applications in personal finance analysis, model training, or software testing.

The system may also find applications in the development of privacy-preserving machine learning techniques. By generating high-quality synthetic data, the system may enable researchers and developers to explore and validate novel privacy-preserving algorithms without requiring access to sensitive real-world datasets. This approach may accelerate the development of privacy-enhancing technologies across various domains.

In educational settings, the system may generate synthetic student data for the development and testing of learning analytics tools. These synthetic datasets may capture patterns of student performance, engagement, and progression without exposing individual student records. For example, the system may create synthetic datasets of student grades, attendance records, and online learning platform interactions. These datasets may be used to develop predictive models for identifying at-risk students or to optimize personalized learning pathways without compromising student privacy.

The synthetic data generation system may also be applied in the field of cybersecurity for generating realistic network traffic data. This synthetic data may be used to train and test intrusion detection systems, simulate cyber-attacks, and develop defensive strategies without exposing sensitive network information. For instance, the system may create synthetic datasets of network logs, packet captures, and system events that mimic both normal operations and various types of cyber-attacks.

In some cases, the system may be used in the retail sector to generate synthetic customer behavior data for market analysis and personalization algorithms. The synthetic data may capture patterns of customer purchases, browsing behavior, and demographic information without revealing individual customer identities. This approach may enable retailers to develop and test customer segmentation models, recommendation systems, and pricing strategies while maintaining customer privacy and complying with data protection regulations.

The present invention provides a technical improvement in the field of synthetic data generation by combining neural template-driven generation with adversarial contrastive sampling, resulting in synthetic datasets that may exhibit increased diversity, adherence to structured domain schemas, and reduced bias compared to conventional methods.

The invention may implement a computing process involving neural network architectures, discriminator training, embedding-based diversity metrics, and iterative feedback loops executed on computer hardware. This hybrid approach may enable efficient and reliable synthetic data generation that is specifically optimized for domain-specific applications, potentially reducing computational costs and improving data quality for downstream machine learning tasks.

The system's use of embedding space distance metrics as a quantifiable diversity measure and adversarial discrimina-tor neural networks for sample validation may represent techniques that address challenges in synthetic data generation.

In some aspects, the "Hybrid Generation Approach" may be defined as a method combining a neural template-driven generation model that produces candidate synthetic data and an adversarial contrastive sampling process that evaluates, selects, and refines samples.

"Integrating samples" may refer to the process of combining accepted and contrastive samples through concatenation or weighted selection to maximize diversity and schema adherence.

A "Diversity threshold" may be a predetermined quantitative value measured using embedding space distance metrics, which may represent the minimum acceptable semantic variance among synthetic data points to prevent redundancy.

The hybrid generation approach may further involve iteratively refining the synthetic data. This refinement process may include applying embedding space distance metrics to quantify diversity, concatenating accepted and contrastive synthetic data samples, and adjusting generation parameters based on discriminator feedback until a diversity threshold is met.

Training the discriminator neural network may involve optimizing a loss function to distinguish between real data samples and synthetic data samples generated by the neural template-driven generation model. This optimization process may improve the discriminator's accuracy in sample validation.

The method may include applying statistical tests such as Wasserstein distance, Maximum Mean Discrepancy, Chi-Square, or Kolmogorov-Smirnov tests to evaluate distributional similarity between synthetic data and reference data. Additionally, the method may involve performing anomaly detection using explainable AI techniques such as SHAP or LIME to identify inconsistencies in the synthetic data.

The system may include iterative loops between generation, discriminator evaluation, and refinement. These loops may involve multiple stages of synthetic data generation, evaluation by the discriminator neural network, and subsequent refinement based on the discriminator's feedback.

The adversarial contrastive sampling and diversity evaluation steps may involve algorithms that compare generated samples to real data, identify similarities and differences, and generate contrastive samples to enhance diversity. These algorithms may utilize embedding space representations of the data to measure semantic similarity and diversity.

The system may employ various parameter ranges for embedding distance thresholds, discriminator training hyperparameters, and scenario-specific configurations. These parameters may be adjusted based on the specific domain and requirements of the synthetic data generation task.

The synthetic data generation process may be implemented in various computing environments, potentially utilizing hardware accelerators such as GPUs or TPUs for efficient neural network computations. The neural network architectures used may include transformer-based models for the template-driven generation and convolutional or recurrent neural networks for the discriminator, depending on the nature of the data being synthesized.

The training process of the hybrid synthetic data generation system involves two interdependent neural network models: a neural template-driven generation model and an adversarial discriminator neural network. Both models are trained iteratively and collaboratively to generate synthetic data that is diverse, accurate, and aligned with domain-specific requirements.

The neural template-driven generation model, typically a Large Language Model (LLM) fine-tuned on domain-specific data, is trained using supervised learning techniques. Training data consists of pairs of structured schemas—defining data fields, inter-field relationships, and distributional targets—and corresponding valid synthetic data samples. This structured approach enables the model to learn the semantics and constraints of the target domain, ensuring that generated data adheres to expected patterns and relationships.

During training, the model minimizes objective functions such as cross-entropy loss or sequence-level loss functions, which quantify the difference between the generated synthetic samples and the target outputs. This process refines the model's ability to produce coherent and semantically valid synthetic data that matches the input schema. For example, in generating synthetic financial transaction records, the model learns to produce valid transaction amounts, timestamps, and account identifiers consistent with the domain schema.

Simultaneously, the adversarial discriminator neural network is trained to distinguish between real or high-quality synthetic data and candidate synthetic samples produced by the generator. This discriminator is trained on labeled datasets comprising authentic domain data marked as positive examples and generated synthetic data marked as negative examples. The network learns to output a confidence score reflecting the likelihood that a sample conforms to the domain's data distribution and structural requirements. For instance, the discriminator may assign a high confidence score to synthetic patient health records that are indistinguishable from real records in terms of feature distributions and attribute correlations, while assigning a low score to unrealistic or inconsistent samples.

Training the discriminator involves minimizing a binary classification loss, such as binary cross-entropy, using stochastic gradient descent or other optimization algorithms. The discriminator's feedback informs the generator, which adjusts its parameters to improve the quality and realism of subsequent synthetic samples. This adversarial training loop continues iteratively, with the generator producing candidate samples and the discriminator refining its ability to judge sample validity, resulting in progressive improvements in data quality.

In addition to adversarial feedback, the system applies contrastive learning principles to maximize the diversity of the synthetic dataset. By embedding generated samples into a learned semantic space, the system calculates embedding space distance metrics-numerical measures of semantic difference between samples. The training process encourages the generator to produce samples that maximize these distances, thereby reducing redundancy and ensuring broad coverage of the data space. This iterative generate-evaluate-select cycle repeats until the synthetic dataset satisfies predefined diversity thresholds, which are quantifiable criteria set based on embedding distances and domain requirements.

Both models undergo detailed hyperparameter tuning to optimize training efficiency and model performance for the specific application domain. For example, when training on a dataset of insurance claims, the system may experiment with batch sizes of 32, 64, and 128, selecting the batch size that balances rapid convergence with stable gradient updates. Learning rates might be tested at values such as 0.0001, 0.0005, and 0.001, choosing the rate that yields the lowest validation loss without overfitting. Architectural parameters like the number of layers (e.g., 3, 5, or 7) and the number of hidden units per layer (e.g., 256, 512, or 1024 neurons) are similarly tuned. Regularization techniques such as dropout, with rates between 0.1 and 0.5, are applied to prevent overfitting and improve generalization.

The discriminator network's hyperparameters are also tuned, including learning rates between 0.00005 and 0.0002, batch sizes of 64 or 128, and network depth adjustments, such as adding convolutional layers to improve feature extraction. Automated search methods like grid search or Bayesian optimization accelerate this tuning process. For instance, Bayesian optimization might determine that a generator batch size of 64, learning rate of 0.0005, five-layer architecture with 512 neurons per layer, and a discriminator learning rate of 0.0001 with 128 batch size provide optimal performance for the domain data.

The tuning process may be augmented by recommendations generated from the Large Language Model itself, which analyzes domain data characteristics and previous training outcomes to suggest promising hyperparameter configurations, thereby narrowing the search space and expediting convergence.

Throughout training, model performance is validated using hold-out subsets of domain-specific data distinct from training samples to prevent overfitting. Metrics such as loss, accuracy, F1-score, and embedding-based diversity scores are evaluated to ensure the models generalize effectively. Only models meeting or exceeding predefined thresholds are selected for deployment.

This comprehensive training strategy, combining adversarial and contrastive learning with neural template-driven generation and extensive hyperparameter tuning, ensures that the resulting synthetic data is structurally valid, semantically rich, diverse, and closely aligned with domain requirements. Consequently, the synthetic datasets generated by this method are highly suitable for training, testing, and validating downstream machine learning models in real-world applications.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for generating synthetic data, comprising:

receiving user input specifying domain-specific requirements for synthetic data generation and selecting a scenario type, wherein the scenario type is one of Seedless, Seeded, or combination of Seeded and Knowledge Base (KB);

defining a structured schema based on the user input, wherein the structured schema includes data fields, relationships between data fields, and distributional targets; and based on the structured schema, generating an initial set of synthetic data samples using a neural template-driven generation model trained on domain-specific data;

applying adversarial contrastive sampling by training a discriminator neural network to distinguish between the initial set of synthetic data samples and real data samples, using the discriminator neural network to identify generated samples similar to the real data samples, and generating a contrastive set of samples dissimilar to those identified as similar by the discriminator, and integrating the initial set of synthetic data samples with the contrastive set to create the synthetic data, wherein, in response to the scenario type being Seeded or the combination, the method further comprising:

performing statistical tests, including Chi-Square or Kolmogorov-Smirnov (KS) tests, to detect divergences between the synthetic data and reference data received for the scenario type being Seeded or the combination; and upon detection of the divergences, adjusting one or more parameters of the synthetic data creation process, wherein the adjustments include modifying a sampling temperature, increasing template variety, or refining the specificity of a retrieval process to enhance statistical alignment between the synthetic data and the reference data.

2. The computer-implemented method of claim 1, further comprising iteratively refining the synthetic data by repeating the generation and adversarial contrastive sampling steps until a predetermined diversity threshold is met, the diversity being measured using embedding space distance metrics between samples.

3. The computer-implemented method of claim 1, wherein the neural template-driven generation model is a Large Language Model, wherein the Large Language Model is trained on a domain-specific corpus annotated with examples of valid synthetic data corresponding to the structured schema.

4. The computer-implemented method of claim 1, further comprising segmenting and indexing large documents into smaller chunks, and storing the chunks in a vector database and/or knowledge graph if the selected scenario involves the use of the knowledge base.

5. The computer-implemented method of claim 4, further comprising performing partial classification on a subset of the chunks, allowing for updates to a taxonomy based on the domain-specific data.

6. The computer-implemented method of claim 1, further comprising validating the structured schema to ensure compliance with domain constraints and resolving conflicts.

7. The computer-implemented method of claim 1, further comprising classifying the user input into entities, relationships, and categories based on the defined schema using a multi-layered classification system when the selected scenario is one of Seeded or combination.

8. The computer-implemented method of claim 1, wherein the synthetic data based on the structured schema is synthesized by performing a retrieval-augmented generation process by conducting a semantic similarity search within the KB using a vector database, and extracting contextual information through knowledge graph traversal to ground the generated synthetic data in relevant domain context.

9. The computer-implemented method of claim 1, wherein the synthetic data based on the structured schema is synthesized by generating counterfactual data points using causal inference techniques to model complex causal relationships and explore "what-if" scenarios.

10. The computer-implemented method of claim 1, wherein the synthetic data based on the structured schema is synthesized by validating the generated synthetic data through local consistency checks, ensuring attribute coherence and adherence to specified constraints, including date and format consistency.

11. The computer-implemented method of claim 1, wherein the statistical tests further include distributional tests such as Wasserstein distance and Maximum Mean Discrepancy.

12. The computer-implemented method of claim 1, further comprising: re-synthesizing by adjusting retrieval queries, constraints, and re-running relevant steps in the synthetic data generation process for iterative refinement of the data.

13. The computer-implemented method of claim 1, wherein the created synthetic data is domain-grounded, privacy-compliant, and ready for machine learning training, testing, and analysis.

14. The computer-implemented method of claim 1, further comprising performing adversarial validation and robustness testing to assess the synthetic data against edge cases, ensuring its readiness for deployment in real-world machine learning applications.

15. The computer-implemented method of claim 1, further comprising evaluating the synthetic data by applying statistical tests and performing embedding space analysis to assess semantic quality.

16. The computer-implemented method of claim 1, further comprising performing anomaly detection on the synthetic data using explainable AI techniques, comprising one or more of SHAP (SHapley Additive explanations), Chain-of-Thought prompting, and, LIME (Local Interpretable Model-agnostic Explanations), to identify gaps or inconsistencies in the synthetic data and provide insights for targeted refinement.

17. The computer-implemented method of claim 16, further comprising re-synthesizing the synthetic data upon detection of the anomaly or when the quality of the synthetic data falls below a defined threshold to generate a final synthetic dataset.

18. A system for generating synthetic data, comprising:

a processor; and a memory storing instructions that, when executed by the processor, cause the processor to:

receive user input specifying domain-specific requirements for synthetic data generation and selecting a scenario type, wherein the scenario type is one of Seedless, Seeded, or combination of Seeded and Knowledge Base (KB);

define a structured schema based on the user input, wherein the structured schema includes data fields, relationships between data fields, and distributional targets; and based on the structured schema, generate an initial set of synthetic data samples using a neural template-driven generation model trained on domain-specific data, apply adversarial contrastive sampling by training a discriminator neural network to distinguish between the initial set of synthetic data samples and real data samples, using the discriminator neural network to identify generated samples similar to the real data samples, and generating a contrastive set of samples dissimilar to those identified as similar by the discriminator, and integrate the initial set of synthetic data samples with the contrastive set to create the synthetic data, wherein, in response to the scenario type being Seeded or the KB being integrated, the method further comprising:

performing statistical tests, including Chi-Square or Kolmogorov-Smirnov (KS) tests, to detect divergences between the synthetic data and reference data received for the scenario type being Seeded or the combination; and upon detection of the divergences, adjusting one or more parameters of the synthetic data creation process, wherein the adjustments include modifying a sampling temperature, increasing template variety, or refining the specificity of a retrieval process to enhance statistical alignment between the synthetic data and the reference data.

\* \* \* \* \*